United States Patent
Ikeda et al.

(10) Patent No.: US 10,922,962 B2
(45) Date of Patent: Feb. 16, 2021

(54) CONGESTION MANAGEMENT APPARATUS AND CONGESTION MANAGEMENT METHOD

(71) Applicant: FUJITSU LIMITED, Kawasaki (JP)

(72) Inventors: Takuro Ikeda, Yokohama (JP); Eiji Kitagawa, Kawasaki (JP); Vishal Sharma, Singapore (SG)

(73) Assignee: FUJITSU LIMITED, Kawasaki (JP)

( * ) Notice: Subject to any disclaimer, the term of this patent is extended or adjusted under 35 U.S.C. 154(b) by 224 days.

(21) Appl. No.: 16/135,580

(22) Filed: Sep. 19, 2018

(65) Prior Publication Data

US 2019/0019404 A1    Jan. 17, 2019

Related U.S. Application Data

(63) Continuation of application No. PCT/JP2016/059297, filed on Mar. 24, 2016.

(51) Int. Cl.
*G06N 7/00* (2006.01)
*G06Q 10/06* (2012.01)
(Continued)

(52) U.S. Cl.
CPC .............. *G08G 1/005* (2013.01); *G06F 16/00* (2019.01); *G06N 7/005* (2013.01); *G06Q 10/047* (2013.01);
(Continued)

(58) Field of Classification Search
CPC .. G06N 7/005; G06Q 10/047; G06Q 10/0637; G06Q 50/30; G08G 1/0145; G08G 1/09
See application file for complete search history.

(56) References Cited

U.S. PATENT DOCUMENTS 9,755,850 B2 * 9/2017 Stolfus ............. G08G 1/096816
10,408,631 B2 * 9/2019 Delaney ............. G01C 21/3484
(Continued)

FOREIGN PATENT DOCUMENTS

EP    3 079 120 A1    10/2016
JP    2001-337967    12/2001
(Continued)

OTHER PUBLICATIONS

Maram Bani Younes et al., "Traffic balancing-based path recommendation mechanisms in vehicular networks", Wireless Communications and Mobile Computing, vol. 16, No. 7, Jan. 29, 2015, pp. 794-809.
(Continued)

*Primary Examiner* — Anshul Sood
(74) *Attorney, Agent, or Firm* — Staas & Halsey LLP

(57) ABSTRACT

A congestion management apparatus includes a memory configured to store, on a per-action-option basis, upper limits on numbers of users allowed to be guided to action options, and a processor coupled to the memory and configured to: generate the action options by time slot for a user; calculate for each of the generated action options, choice probabilities of the action options with respect to the user, and store the calculated choice probabilities in the memory; and calculate for each of the action options, estimated numbers of previous users assumed to have selected the action options, based on choice probabilities of each of the action options with respect to the previous users, the choice probabilities being obtained from the memory, wherein the processor is configured to extract, based on the upper limits and the estimated numbers for the action options, action options to be presented to the user.

11 Claims, 25 Drawing Sheets

(51) Int. Cl.
  *G08G 1/09* (2006.01)
  *G08G 1/005* (2006.01)
  *G06F 16/00* (2019.01)
  *G06Q 50/30* (2012.01)
  *G06Q 10/04* (2012.01)
  *G08G 7/00* (2006.01)

(52) U.S. Cl.
  CPC ......... *G06Q 10/0637* (2013.01); *G06Q 50/30* (2013.01); *G08G 1/09* (2013.01); *G08G 7/00* (2013.01)

(56) References Cited

U.S. PATENT DOCUMENTS

| | | | |
|---|---|---|---|
| 2005/0027447 A1* | 2/2005 | Hirose | G01S 19/48 701/423 |
| 2008/0262710 A1* | 10/2008 | Li | G08G 1/096844 701/117 |
| 2012/0226434 A1* | 9/2012 | Chiu | G08G 1/096811 701/117 |
| 2013/0268148 A1 | 10/2013 | Kondo et al. | |
| 2014/0365250 A1 | 12/2014 | Ikeda et al. | |
| 2015/0051822 A1 | 2/2015 | Joglekar | |
| 2016/0321764 A1* | 11/2016 | Cardoso | G01C 21/3484 |

FOREIGN PATENT DOCUMENTS

| | | |
|---|---|---|
| JP | 2004-122883 | 4/2004 |
| JP | 2005-75245 | 3/2005 |
| JP | 2005-186783 | 7/2005 |
| JP | 2006-3169 | 1/2006 |
| JP | 2006-121535 | 5/2006 |
| JP | 2008-184032 | 8/2008 |
| JP | 2009-23444 | 2/2009 |
| JP | 2011-141773 | 7/2011 |
| JP | 2012-83906 | 4/2012 |
| JP | 2014-104764 | 6/2014 |
| JP | 2014-225098 | 12/2014 |
| JP | 2014-238831 | 12/2014 |
| JP | 2015-9604 | 1/2015 |
| JP | 2015-108913 | 6/2015 |
| WO | 2012/086000 A1 | 6/2012 |

OTHER PUBLICATIONS

Extended European Search Report dated Jan. 9, 2019 in corresponding European Patent Application No. 16895387.5.
Patent Abstracts of Japan English abstract corresponding to Japanese Patent Publication No. 2014-104764, published Jun. 9, 2014.
Patent Abstracts of Japan English abstract corresponding to Japanese Patent Publication No. 2015-108913, published Jun. 11, 2015.
Patent Abstracts of Japan English abstract corresponding to Japanese Patent Publication No. 2011-141773, published Jul. 21, 2011.
Patent Abstracts of Japan English abstract corresponding to Japanese Patent Publication No. 2004-122883, published Apr. 22, 2004.
Patent Abstracts of Japan English abstract corresponding to Japanese Patent Publication No. 2005-186783, published Jul. 14, 2005.
Patent Abstracts of Japan English abstract corresponding to Japanese Patent Publication No. 2009-23444, published Feb. 5, 2009.
Patent Abstracts of Japan English abstract corresponding to Japanese Patent Publication No. 2015-9604, published Jan. 19, 2015.
Patent Abstracts of Japan English abstract corresponding to Japanese Patent Publication No. 2001-337967, published Dec. 7, 2001.
Japanese Platform for Patent Information English abstract corresponding to Japanese Patent Publication No. 2012-83906, published Apr. 26, 2012.
Espacenet English abstract corresponding to Japanese Patent Publication No. 2006-121535, published May 11, 2006.
Espacenet English abstract corresponding to Japanese Patent Publication No. 2006-3169, published Jan. 5, 2006.
Espacenet English abstract corresponding to Japanese Patent Publication No. 2014-225098, published Dec. 4, 2014.
Espacenet English abstract corresponding to Japanese Patent Publication No. 2005-75245, published Mar. 24, 2005.
Espacenet English abstract corresponding to Japanese Patent Publication No. 2014-238831, published Dec. 18, 2014.
Espacenet English abstract corresponding to Japanese Patent Publication No. 2008-184032, published Aug. 14, 2008.
International Search Report dated Jun. 21, 2016 in corresponding International Patent Application No. PCT/JP2016/059297.
Written Opinion of the International Searching Authority dated Jun. 21, 2016 in corresponding International Patent Application No. PCT/JP2016/059297.

* cited by examiner

FIG.4

| User ID | $ASC_M$ | $ASC_B$ | $ASC_T$ | $\beta_{fare}$ | $\beta_{TT}$ | $\beta_{DT}$ | $\beta_{CG}$ |
|---|---|---|---|---|---|---|---|
| 001 | 0 | 0 | 5 | −0.5 | −0.3 | −0.4 | −2 |
| 002 | 0 | 1 | 3 | −0.4 | −0.25 | −0.3 | −1 |
| 003 | 0 | −1 | 4 | −0.3 | −0.2 | −0.3 | −1.5 |
| ⋮ | ⋮ | ⋮ | ⋮ | ⋮ | ⋮ | ⋮ | ⋮ |

| TIME SLOT<br>TRANSIT | 17:00<br>(I=0) | 17:15<br>(I=1) | 17:30<br>(I=2) | 17:45<br>(I=3) |
|---|---|---|---|---|
| RAILWAY M | 500 | 500 | 500 | 500 |
| BUS B | 300 | 300 | 300 | 300 |
| TAXI T | 100 | 100 | 100 | 100 |

| TIME SLOT<br>TRANSIT | 17:00<br>(I=0) | 17:15<br>(I=1) | 17:30<br>(I=2) | 17:45<br>(I=3) |
|---|---|---|---|---|
| RAILWAY M | 2 | 3 | 3 | 2 |
| BUS B | 3 | 2 | 1 | 1 |
| TAXI T | 1 | 3 | 2 | 2 |

| TIME SLOT<br>TRANSIT | 17:00<br>(I=0) | 17:15<br>(I=1) | 17:30<br>(I=2) | 17:45<br>(I=3) |
|---|---|---|---|---|
| RAILWAY M | 250 | 200 | 100 | 150 |
| BUS B | 100 | 200 | 230 | 180 |
| TAXI T | 10 | 5 | 15 | 20 |

| TIME SLOT / TRANSIT | 17:00 (I=0) | 17:15 (I=1) | 17:30 (I=2) | 17:45 (I=3) |
|---|---|---|---|---|
| RAILWAY M (n=M) | $p_{M,0}$ | $p_{M,1}$ | $p_{M,2}$ | $p_{M,3}$ |
| BUS B (n=B) | $p_{B,0}$ | $p_{B,1}$ | $p_{B,2}$ | $p_{B,3}$ |
| TAXI T (n=T) | $p_{T,0}$ | $p_{T,1}$ | $p_{T,2}$ | $p_{T,3}$ |

FIG.14

| TIME SLOT / TRANSIT | 17:00 (I=0) | 17:15 (I=1) | 17:30 (I=2) | 17:45 (I=3) |
|---|---|---|---|---|
| RAILWAY M (n=M) | × | ○ | ○ | ○ |
| BUS B (n=B) | × | ○ | × | ○ |
| TAXI T (n=T) | ○ | × | ○ | ○ |

141

$$X = \begin{pmatrix} 0 & 0 & 1 & 1 \\ 0 & 1 & 0 & 1 \\ 1 & 0 & 1 & 1 \end{pmatrix}$$

⇒ Pr-1

| | I=0 | I=1 | I=2 | I=3 |
|---|---|---|---|---|
| n=M | 0 | 0.2 | 0.25 | 0.15 |
| n=B | 0 | 0.3 | 0 | 0.1 |
| n=T | 0.25 | 0 | 0.35 | 0.1 |

FIG.15A $$X = \begin{pmatrix} 0 & 0 & 1 & 1 \\ 0 & 1 & 0 & 1 \\ 0 & 0 & 1 & 1 \end{pmatrix}$$

⇒ Pr-2

| | I=0 | I=1 | I=2 | I=3 |
|---|---|---|---|---|
| n=M | 0 | 0.21 | 0.21 | 0.17 |
| n=B | 0 | 0.32 | 0 | 0.12 |
| n=T | 0 | 0 | 0.32 | 0.12 |

FIG.15B $$X = \begin{pmatrix} 0 & 0 & 1 & 1 \\ 0 & 1 & 0 & 1 \\ 1 & 0 & 1 & 1 \end{pmatrix}$$

⇒ Pr-3

| | I=0 | I=1 | I=2 | I=3 |
|---|---|---|---|---|
| n=M | 0 | 0 | 0.25 | 0.15 |
| n=B | 0 | 0.32 | 0 | 0.12 |
| n=T | 0.27 | 0 | 0.35 | 0.12 |

| User ID | $ASC_M$ | $ASC_B$ | $ASC_T$ | $\beta_{fare}$ | $\beta_{TT}$ | $\beta_{DT}$ | $\beta_{CG}$ | $\beta_I$ 210A |
|---|---|---|---|---|---|---|---|---|
| 001 | 0 | 0 | 5 | -0.5 | -0.3 | -0.4 | -2 | 3 |
| 002 | 0 | 1 | 3 | -0.4 | -0.25 | -0.3 | -1 | 5 |
| 003 | 0 | -1 | 4 | -0.3 | -0.2 | -0.3 | -1.5 | 4 |
| ⋮ | ⋮ | ⋮ | ⋮ | ⋮ | ⋮ | ⋮ | ⋮ | ⋮ |

| TIME SLOT / TRANSIT AND DROP-IN PLACE | 17:00 (I=0) | 17:15 (I=1) | 17:30 (I=2) | 17:45 (I=3) |
|---|---|---|---|---|
| RAILWAY M | 500 | 500 | 500 | 500 |
| BUS B | 300 | 300 | 300 | 300 |
| TAXI T | 100 | 100 | 100 | 100 |
| STORE K | 20 | 50 | 50 | 50 |

| TIME SLOT / TRANSIT AND DROP-IN PLACE | 17:00 (I=0) | 17:15 (I=1) | 17:30 (I=2) | 17:45 (I=3) |
|---|---|---|---|---|
| RAILWAY M | 2 | 3 | 3 | 2 |
| BUS B | 3 | 2 | 1 | 1 |
| TAXI T | 1 | 3 | 2 | 2 |
| STORE K | 2 | 1 | 1 | 1 |

FIG.21

| TIME SLOT<br>TRANSIT AND<br>DROP-IN PLACE | 17:00<br>(I=0) | 17:15<br>(I=1) | 17:30<br>(I=2) | 17:45<br>(I=3) |
|---|---|---|---|---|
| RAILWAY M | 250 | 200 | 100 | 150 |
| BUS B | 100 | 200 | 230 | 180 |
| TAXI T | 10 | 5 | 15 | 20 |
| STORE K | 20 | 40 | 40 | 50 |

| STORE NAME | COUPON AVAILABILITY | LOCATION |
|---|---|---|
| STORE K | AVAILABLE | STATION A |
| STORE I | UNAVAILABLE | CITY B |
| ⋮ | ⋮ | ⋮ |

INCENTIVE i=0                                         91A-1

| TRANSIT / TIME SLOT | 17:00 (l=0) | 17:15 (l=1) | 17:30 (l=2) | 17:45 (l=3) |
|---|---|---|---|---|
| RAILWAY M (n=M) | $p_{M,0,0}$ | $p_{M,1,0}$ | $p_{M,2,0}$ | $p_{M,3,0}$ |
| BUS B (n=B) | $p_{B,0,0}$ | $p_{B,1,0}$ | $p_{B,2,0}$ | $p_{B,3,0}$ |
| TAXI T (n=T) | $p_{T,0,0}$ | $p_{T,1,0}$ | $p_{T,2,0}$ | $p_{T,3,0}$ |

FIG.24B

INCENTIVE i=1                                         91A-2

| TRANSIT / TIME SLOT | 17:00 (l=0) | 17:15 (l=1) | 17:30 (l=2) | 17:45 (l=3) |
|---|---|---|---|---|
| RAILWAY M (n=M) | $p_{M,0,1}$ | $p_{M,1,1}$ | $p_{M,2,1}$ | $p_{M,3,1}$ |
| BUS B (n=B) | $p_{B,0,1}$ | $p_{B,1,1}$ | $p_{B,2,1}$ | $p_{B,3,1}$ |
| TAXI T (n=T) | $p_{T,0,1}$ | $p_{T,1,1}$ | $p_{T,2,1}$ | $p_{T,3,1}$ |

CONGESTION MANAGEMENT APPARATUS AND CONGESTION MANAGEMENT METHOD

CROSS-REFERENCE TO RELATED APPLICATIONS

This application is a continuation application of International Application PCT/JP2016/059297 filed on Mar. 24, 2016 and designated the U.S., the entire contents of which are incorporated herein by reference.

FIELD

The disclosures herein relate to a congestion management apparatus, a recording medium, and a congestion management method.

BACKGROUND

It is generally known that traffic congestion occurs when crowds of people use transportation after a large-scale event or when the supply of transportation services significantly decreases due to a train delay or accident.

Conventionally, a technique is known that guides user so as to relieve congestion by displaying available transit systems along with congestion status of the respective transit systems on a terminal device upon receiving a request for presenting transit systems together with a departure location and a destination location from the terminal device.

The above-described technique is intended to provide uniform information to a large number of unspecified users, and is not intended to take into account whether or not an individual user makes any changes such as changes in a transit system used and a departure time in order to avoid congestion.

Therefore, depending on the number of users who change transit systems or departure times in order to avoid congestion, the conventional technique may be insufficient to reduce congestion, and further, the conventional technique may sometimes cause congestion in another transit system or in another time slot. Accordingly, it is difficult for the conventional technique to contribute to sufficiently reducing congestion.

RELATED-ART DOCUMENTS

Patent Document 1

[Patent Document 1] Japanese Laid-open Patent Publication No. 2001-337967
[Patent Document 2] Japanese Laid-open Patent Publication No. 2014-104764
[Patent Document 3] Japanese Laid-open Patent Publication No. 2015-108913
[Patent Document 4] Japanese Laid-open Patent Publication No. 2011-141773

SUMMARY

According to an aspect of the embodiment, a congestion management apparatus includes a memory configured to store, on a per-action-option basis, upper limits on numbers of users allowed to be guided to actions indicated by action options; and a processor coupled to the memory and configured to generate the action options by time slot for a user, calculate for each of the generated action options, choice probabilities of the action options with respect to the user, and store the calculated choice probabilities in the memory, and calculate for each of the action options, estimated numbers of previous users assumed to have selected the action options, based on choice probabilities of each of the action options with respect to the previous users, the choice probabilities being obtained from the memory, wherein the processor is configured to extract, based on the upper limits and the estimated numbers for the action options, action options to be presented to the user.

The object and advantages of the embodiment will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

In the following, embodiments of the present invention will be described with reference to the accompanying drawings.

FIG. 4 is a drawing illustrating an example of a user database according to the first embodiment;

FIG. 5 is a drawing illustrating an example of a guide upper limit database according to the first embodiment;

FIG. 6 is a drawing illustrating an example of a congestion level database according to the first embodiment;

FIG. 7 is a drawing illustrating an example of an estimated number database according to the first embodiment;

FIG. 9 is a drawing illustrating action options according to the first embodiment;

FIG. 14 is a first drawing illustrating an example of a set of feasible action options;

FIGS. 15A through 15C are second drawings illustrating an example of the set of the feasible action options;

FIG. 18 is a drawing illustrating an example of a user database according to the second embodiment;

FIG. 19 is a drawing illustrating an example of an upper limit database according to the second embodiment;

FIG. 20 is a drawing illustrating an example of a congestion level database according to the second embodiment;

FIG. 21 is a drawing illustrating an example of an estimated number database according to the second embodiment;

FIG. 22 is a drawing illustrating an example of a coupon information database according to the second embodiment;

FIGS. 24A and 24B are drawings illustrating action options according to the second embodiment;

DESCRIPTION OF EMBODIMENTS

First Embodiment

According to an embodiment, it is possible to allow an action contributing to reducing congestion to be selected.

Figure 1:
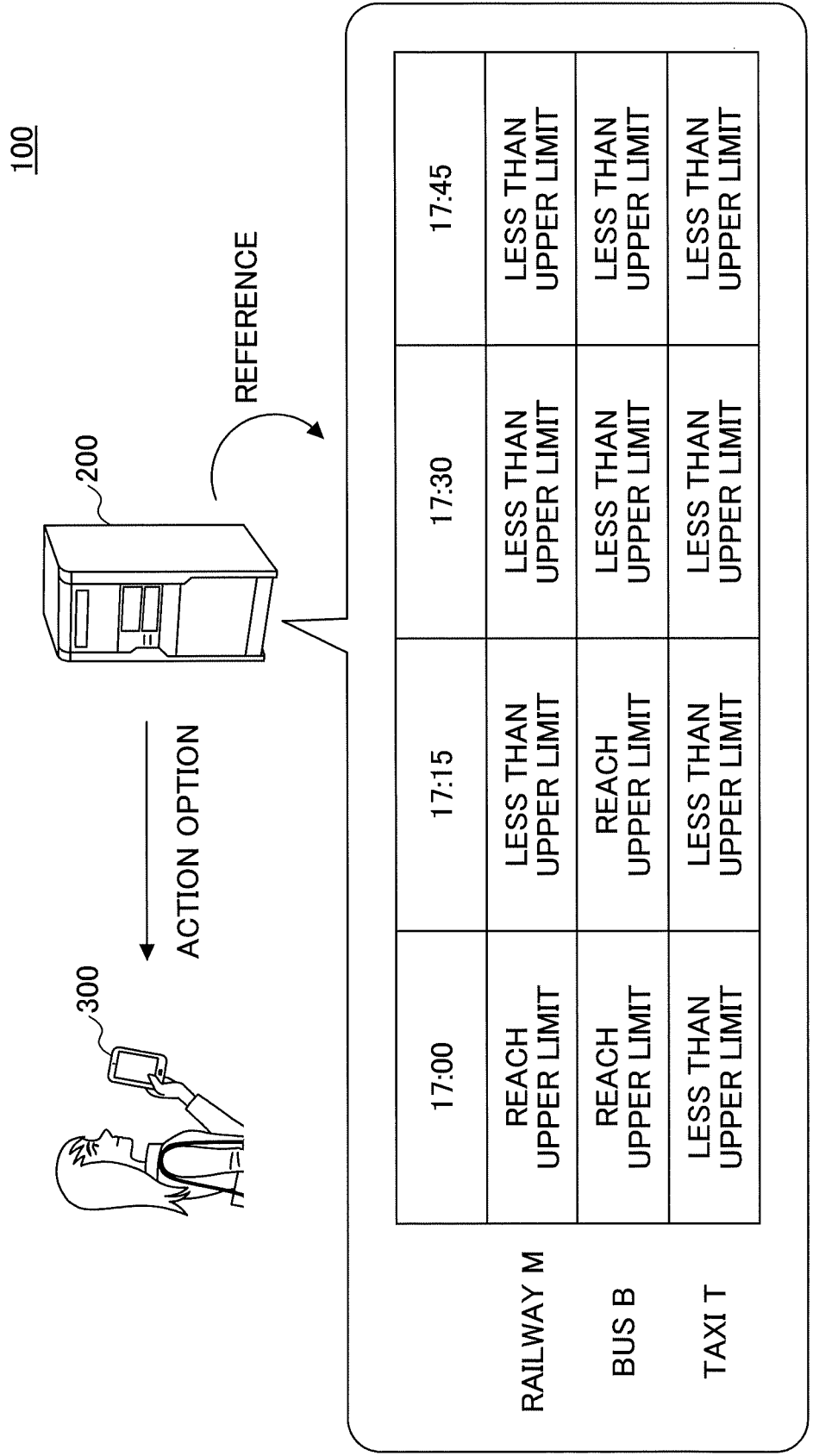
FIG. 1 is a drawing illustrating presentation of action options.

In the following, a first embodiment will be described with reference to the accompanying drawings. FIG. 1 is a drawing illustrating presentation of action options.

In a congestion management system 100 according to the present embodiment, upon receiving a request for presenting available transit options together with a departure location and a destination location from a terminal device 300 of a user, a congestion management apparatus 200 causes the terminal device 300 to display candidate transit options.

At this time, the congestion management apparatus 200 according to the present embodiment first extracts transit options based on a departure time, the departure location, and the destination location. Next, for each of the extracted transit options, the congestion management apparatus 200 refers to information in which an upper limit on the numbers of users allowed to be guided to each of the transit options is respectively associated with an estimated number of users assumed to have been previously guided to each of the transit options. Then, the congestion management apparatus 200 extracts available transit options that do not reach the respective upper limits. The congestion management apparatus 200 causes the terminal device 300 to display the extracted transit options in descending order of contribution to reducing congestion and also of probability of being selected by the user.

In the present embodiment, by displaying candidate transit options on the terminal device 300, it is possible to allow an action contributing to reducing congestion to be selected.

A transit option according to the present embodiment refers to an option that allows a user to select a transit method including transportation, a time, and a route from a departure location to a destination location. The upper limit on the number of users allowed to be guided to each transit option and the estimated number of users assumed to have been previously guided to each transit option will be described later in detail.

In the following, the transit option is also referred to as an action option. The action option according to the present embodiment represents an option that can be taken by a user. The transit option is an example of an action that can be taken by the user for transit. The action option according to the present embodiment includes not only a transit option, but also an action that can be taken by the user such as shopping and dropping in at a restaurant.

Further, in the present embodiment, a request for presenting transit options transmitted from the terminal device 300 to the congestion management apparatus 200 is an example of a request for presenting action options. In the following, a request transmitted from the terminal device 300 to the congestion management apparatus 200 is referred to as a request for presenting action options. The request for presenting action options according to the present embodiment is a request for outputting (suggesting) favorable action options that are easy to be accepted by the user and are suitable for the user's preference.

Referring to FIG. 1, an operation of the congestion management apparatus 200 will be described below. In the example of FIG. 1, in response to a request for presentation from the terminal device 300, transit options of railway M, bus B, and taxi T respectively operating in time slots of 17:00 to 17:14, 17:15 to 17:29, 17:30 to 17:44, and 17:45 to 17:59 are extracted in accordance with a departure location, a destination location, and a departure time.

At this time, the congestion management apparatus 200 refers to a memory that stores the upper limits on the numbers of users allowed to be guided to the respective transit options and the estimated numbers of users assumed to have been previously guided to the respective transit options, and extracts transit options whose estimated numbers do not reach the respective upper limits.

In the example of FIG. 1, three transit options of railway M and bus B operating in the time slot of 17:00 to 17:14 and bus B operating in the time slot of 17:15 to 17:29 reach the respective upper limits.

Therefore, the congestion management apparatus 200 excludes the above-described three transit options, and extracts the remaining options as available transit options. The congestion management apparatus 200 causes the terminal device 300 to display the available transit options in descending order of contribution to reducing congestion and also of probability of being selected by the user of the terminal device 300.

Figure 2:
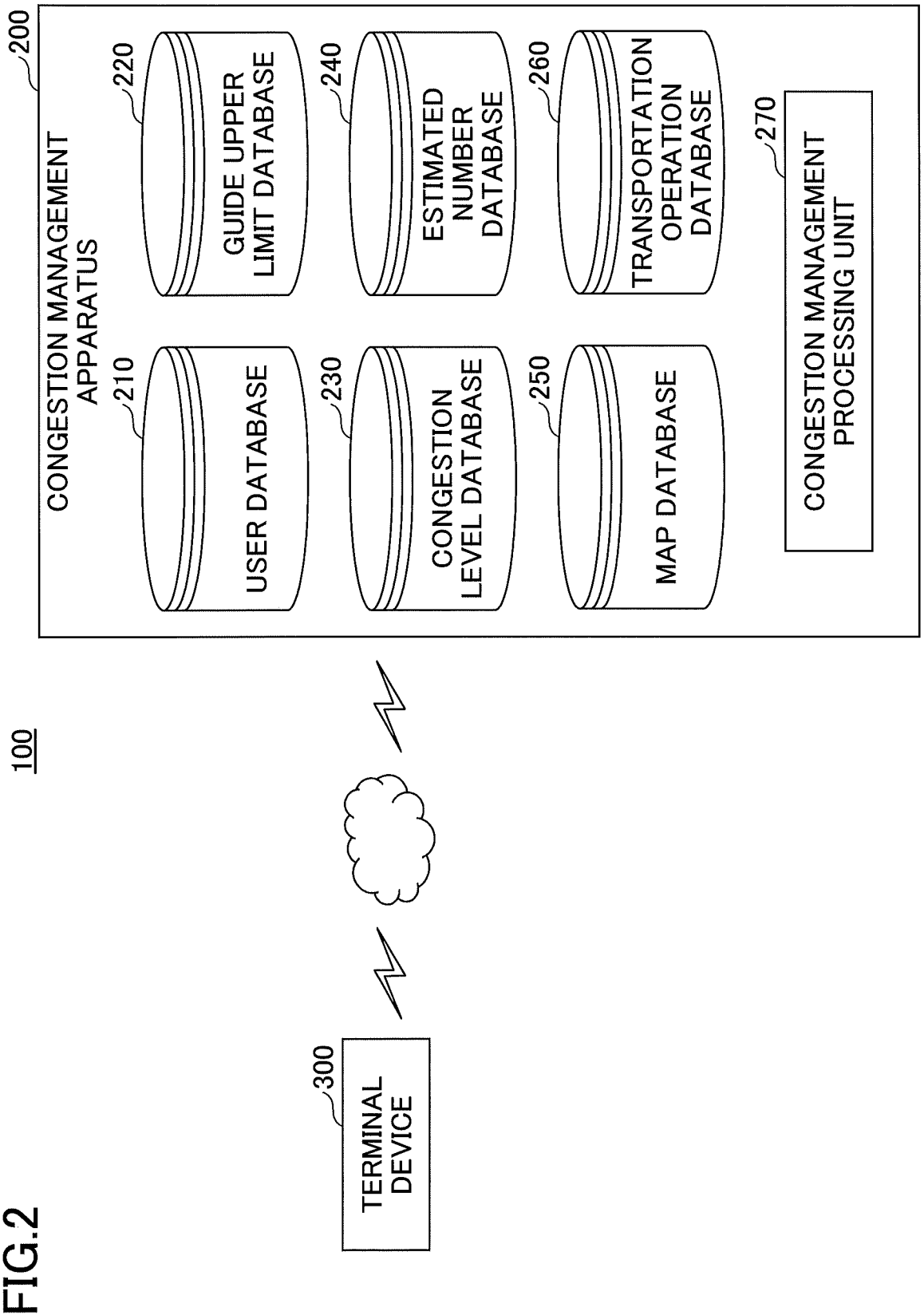
FIG. 2 is a drawing illustrating a system configuration of a congestion management system according to a first embodiment.

In the following, the congestion management system 100 according to the present embodiment will be described. FIG. 2 is a drawing illustrating a system configuration of the congestion management system according to the first embodiment.

The congestion management system 100 according to the present embodiment includes the congestion management apparatus 200 and the terminal device 300. The congestion management apparatus 200 and the terminal device 300 are connected to each other via a network.

The congestion management apparatus 200 according to the present embodiment includes a user database 210, a guide upper limit database 220, a congestion level database 230, an estimated number database 240, a map database 250, and a transportation operation database 260. Also, the congestion management apparatus 200 according to the present embodiment includes a congestion management processing unit 270.

Upon receiving a request for presenting transit options from the terminal device 300, the congestion management processing unit 270 according to the present embodiment refers to the databases and causes the terminal device 300 to display extracted transit options in descending order of contribution to alleviating congestion and also of probability of being selected by the user of the terminal device 300.

In other words, upon receiving a request for presenting action options from the terminal device 300, the congestion management processing unit 270 refers to the databases and causes the terminal device 300 to display extracted action options in descending order of contribution to alleviating congestion and also of probability of being selected by the user of the terminal device 300.

In the example of FIG. 2, the map database 250 and the transportation operation database 260 according to the present embodiment are included in the congestion management apparatus 200; however, the present embodiment is not limited thereto. The map database 250 and the transportation operation database 260 may be included in an external device. Further, the other databases according to the embodiment may also be included in an external device.

Figure 3:
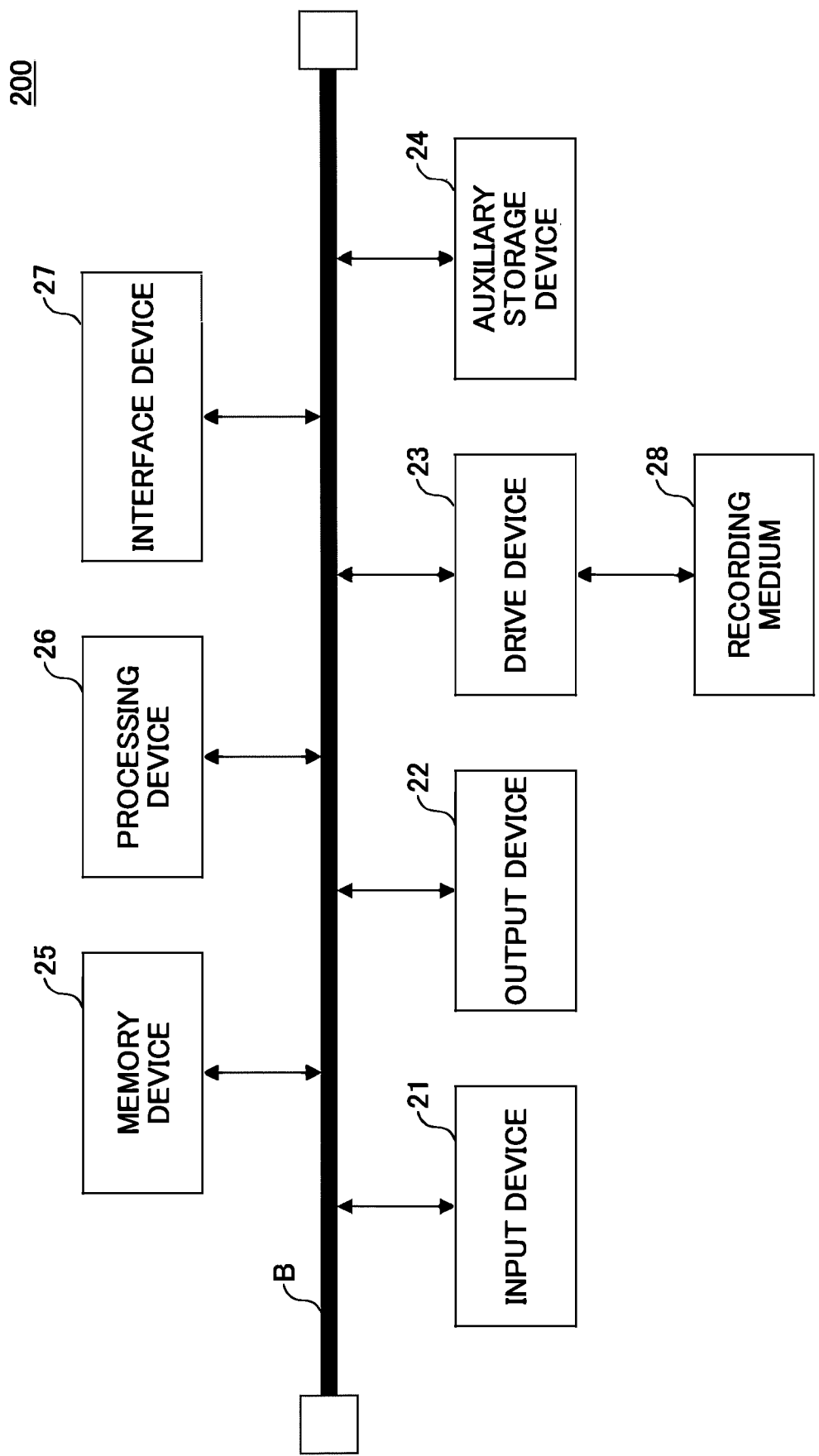
FIG. 3 is a drawing illustrating a hardware configuration of a congestion management apparatus.

Next, referring to FIG. 3, a hardware configuration of the congestion management apparatus 200 according to the present embodiment will be described. FIG. 3 is a drawing illustrating the hardware configuration of the congestion management apparatus.

The congestion management apparatus 200 according to the present embodiment includes an input device 21, an output device 22, a drive device 23, an auxiliary storage device 24, a memory device 25, a processing device 26, and an interface device 27, which are connected to each other via a bus B.

The input device 21 is used to input various types of signals and display various types of information. The input device 21 may be a mouse or a keyboard, for example. The output device 22 is used to output various types of information, and may be a display, for example.

The interface device 27 includes, for example, a modem and a LAN card, and is used to connect to a network.

A congestion management program is at least a part of various programs that control the congestion management apparatus 200. The congestion management program is, for example, distributed from a recording medium 28 or downloaded via a network. Examples of the recording medium 28 storing the congestion management program include various types of recording mediums, including a recording medium that optically, electrically, or magnetically stores information such as a CD-ROM, a flexible disk, and a magneto-optical disc and including semiconductor memory that electrically stores information such as ROM and flash memory.

Further, when the recording medium 28 storing the congestion management program is loaded into the drive device 23, the congestion management program is installed from the recording medium 28 through the drive device 23 into the auxiliary storage device 24. Also, when the congestion management program is downloaded via the network, the congestion management program is installed in the auxiliary storage device 24 through the interface device 27.

The auxiliary storage device 24 stores the installed congestion management program and also stores required files and data, for example. At startup of a computer, the memory device 25 reads the congestion management program from the auxiliary storage device 24 and stores the congestion management program. Further, the processing device 26 executes various types of processes according to the congestion management program stored in the memory device 25 as will be described later.

The terminal device 300 according to the present embodiment is a commonly available tablet computer, a smartphone, or the like. The terminal device 300 has the same hardware configuration as that of the congestion management apparatus, except that the terminal device 300 includes a display operation device instead of an input device and an output device, and thus, a description thereof will be omitted. Further, the terminal device 300 may be a terminal device other than the tablet computer and the smartphone. Specifically, the terminal device 300 may be a notebook computer or may be a commonly available desktop computer.

Next, the databases included in the congestion management apparatus 200 according to the present embodiment will be described.

FIG. 4 is a drawing illustrating an example of the user database according to the first embodiment. The user database 210 according to the present embodiment stores parameters for each user. The parameters are used to calculate utility for each user on a per-action option basis. In the present embodiment, the congestion management processing unit 270 performs a process for calculating utility of an action option for each user by using the parameters stored in the user database 210, which will be described later.

Utility of an action option is a concept used in the microeconomics field and represents a satisfaction level obtained by a user from the action option.

The user database 210 according to the present embodiment includes, as information items, "user ID," $ASC_M$, "$ASC_B$," $ASC_T$, "$\beta_{fare}$," "$\beta_{TT}$," "$\beta_{DT}$," and "$\beta_{CG}$."

In the user database 210 according to the present embodiment, the item "user ID" is associated with the other items. Information including the item "user ID" and the other items is referred to as user information.

Further, in the user database 210 in FIG. 4, the item "user ID" is associated with the other items; however, the present embodiment is not limited thereto. In the user database 210, the user ID may be associated with a user name, age, and gender in addition to the parameters illustrated in FIG. 4.

The item "user ID" is identification information for identifying a user. Further, in the item "user ID" according to the present embodiment, when the terminal device 300 is used only by a specific user, identification information for identifying the terminal device 300 may be used as a user ID in the item "user ID" according to the present embodiment.

The item "$ASC_M$" represents a satisfaction level obtained by a user from railway M. The item "$ASC_B$" represents a satisfaction level obtained by a user from bus B. The item "$ASC_T$" represents a satisfaction level obtained by a user from taxi T.

Values of the items "$ASC_M$," "$ASC_B$," and "$ASC_T$" are constants uniquely determined for the respective transit options.

The item "$\beta_{fare}$" represents weight given to a fare charged by selecting an action option. In other words, the item "$\beta_{fare}$" represents how much a fare contributes to a satisfaction level of an action option selected by a user.

The item "$\beta_{TT}$" represents weight given to a transit time. In other words, the item "$\beta_{TT}$" represents how much a transit time contributes to a satisfaction level of an action option selected by a user.

The item "$\beta_{DT}$" represents weight given to a waiting time. A waiting time is a period of time from the current time to a time at which transit starts. In other words, the item "$\beta_{DT}$" represents how much a waiting time before transit starts contributes to a satisfaction level of an action option selected by a user.

The item "$\beta_{CG}$" represents weight given to a congestion level of a selected action option and a corresponding action.

In other words, the item "$\beta_{CG}$" represents how much a congestion level contributes to a satisfaction level of an action option selected by a user. The "congestion level" means a congestion level of a transit option when an action corresponding to a selected action option represents transit. Also, the "congestion level" means a congestion level of a store at which to make a purchase when an action corresponding to a selected action option represents shopping. Namely, the congestion level according to the present embodiment indicates a congestion level experienced when an action corresponding to a selected action option is taken.

In FIG. 4, in the case of a user identified by a user ID "001," the item "$\beta_{CG}$" indicates the smallest value of "−2" among the other items indicating weight. Accordingly, it is seen that the user tends to dislike congestion.

Next, referring to FIG. 5, the guide upper limit database 220 will be described. FIG. 5 is a drawing illustrating an example of the guide upper limit database according to the first embodiment.

The guide upper limit database 220 according to the present embodiment stores the upper limits on the numbers of users allowed to be guided to respective transit systems in time slots. An upper limit on the number of users allowed to be guided may be a number functioning as a threshold above which it is determined that discomfort is caused to many people from congestion.

In the following, the upper limit on the number of users allowed to be guided is referred to as a guide upper limit.

The example of FIG. 5 indicates four time slots of 17:00 to 17:14, 17:15 to 17:29, 17:30 to 17:44, and 17:45 to 17:59. In the following, when l denotes a time slot, a time slot "l=0" represents 17:00 to 17:14, a time slot "l=1" represents 17:15 to 17:29, a time slot "l=2" represents 17:30 to 17:44, and a time slot "l=3" represents 17:45 to 17:59.

Also, in FIG. 5, transit by railway M, transit by bus B, and transit by taxi T are illustrated as examples of the above-described transit systems in each of the time slots; however, the present embodiment is not limited thereto. The guide upper limit database 220 may store guide upper limits for any number of transit systems.

In FIG. 5, a guide upper limit for railway M is 500, a guide upper limit for bus B is 300, and a guide upper limit for taxi T is 100 in each of the time slots l=0 to 3.

In other words, in the example of FIG. 5, the guide upper limit for an action option of transiting by "railway M" in the time slot "l=0" is 500. Similarly, in the example of FIG. 5, the guide upper limit for an action option of transiting by "bus B" in the time slot "l=0" is 300. Further, in the example of FIG. 5, the guide upper limit for an action option of transiting by "taxi T" in the time slot "l=0" is 100.

As described, in the example of FIG. 5, a combination of a time slot and a transit system is regarded as one action option.

The guide upper limit database 220 according to the present embodiment is preliminarily stored in the congestion management apparatus 200. For example, a guide upper limit may be determined based on an operating frequency of transportation by time slot, a capacity of passengers per car, and the like.

Further, in FIG. 5, a combination of a time slot and a transit system is regarded as an action option; however, the present embodiment is not limited thereto. For example, an action option may be a combination of a time slot and participation in an event. Alternatively, an action option may be a combination of a time slot and watching a movie. In this case, a guide upper limit may be determined based on a seating capacity of an event site, a seating capacity of a theater, and the like.

Further, in FIG. 5, the time slots l=0 to 3 are set; however, the present embodiment is not limited thereto. The guide upper limit database 220 may include any time slot. In the guide upper limit database 220, guide upper limits may be set in time slots from early morning to late at night, and also, duration of time slots may be any duration.

Next, referring to FIG. 6, the congestion level database 230 will be described. FIG. 6 is a drawing illustrating an example of the congestion level database according to the first embodiment.

The congestion level database 230 according to the present embodiment stores transit systems by time slot in association with congestion levels. In other words, the congestion level database 230 stores action options each associated with a corresponding congestion level.

In the present embodiment, the congestion level database 230 is preliminarily stored in the congestion management apparatus 200.

In the example of FIG. 6, combinations of the transit systems "railway M," "bus B," and "taxi T" and the time slots "l=0 to 3" are each associated with a corresponding congestion level.

The congestion levels according to the present embodiment are defined for each transit system. To be more specific, the congestion level of "railway M" is classified into levels 1 to 3. The congestion level 1 indicates that seats are available. The congestion level 2 indicates that seats are not available, but discomfort is not caused. The congestion level 3 indicates that seats are not available and discomfort may be caused. The congestion levels according to the present embodiment may be determined based on, for example, statistics of passenger occupancy rates.

In the case of "bus B," similarly to the railway, the congestion level in the bus itself may be classified into levels 1 to 3. Further, the congestion level of "bus B" may combine a congestion level in the bus itself and a congestion level on the road.

Further, in the case of "taxi T," it is conceived that the congestion level is classified into levels 1 to 3 based on a waiting time at a taxi stand. In the present embodiment, when the waiting time is less than 5 minutes, the congestion level may be regarded as the level 1, when the waiting time is less than 15 minutes, the congestion level may be regarded as the level 2, and when the waiting time is more than 15 minutes, the congestion level may be regarded as the level 3.

Further, action options each associated with a corresponding congestion level include action options other than those illustrated in FIG. 6. Also, similarly to FIG. 5, the time slots stored in congestion level database 230 may be any time slots.

Next, the estimated number database 240 according to the present embodiment will be described. FIG. 7 is a drawing illustrating an example of the estimated number database according to the first embodiment.

The estimated number database 240 according to the present embodiment is updated each time the congestion management apparatus 200 causes the terminal device 300 to display action options upon receiving a request for presenting action options from the terminal device 300.

The estimated number database 240 according to the present embodiment stores, by time slot, the numbers of users assumed to have been previously guided to the respective transit systems. In other words, the estimated number database 240 stores, by action option, the numbers of users assumed to have previously performed actions indicated by the respective action options.

The number of users assumed to have been previously guided is hereinafter referred to as the "estimated number". Namely, it can be said that the estimated number is the number of users assumed to have been guided to an action option presented by the congestion management apparatus 200 and assumed to have selected the presented action option.

FIG. 7 illustrates the estimated number database 240 that stores the estimated numbers for respective combinations of the transit systems "railway M," "bus B," and "taxi T" and the time slots l=0 to 3.

In the example of FIG. 7, the estimated number of users assumed to have previously performed an action of "transiting by "railway M" in the time slot l=0 (17:00 to 17:14)" is 250. Further, in the example of FIG. 7, the estimated number of users assumed to have previously performed an action of "transiting by "bus B" in the time slot l=0 (17:00 to 17:14)" is 100. Further, the estimated number of users assumed to have previously performed an action of "transiting by "taxi T" in the time slot l=0 (17:00 to 17:14)" is 10. A method for calculating the estimated number according to the present embodiment will be described later in detail.

Further, the estimated number database 240 according to the present embodiment stores the estimated numbers for the respective combinations of the transit systems "railway M, "bus B," and "taxi T" and the time slots l=0 to 3; however, the present embodiment is not limited thereto. The estimated number database 240 according to the present embodiment may have the same action options as those stored in the guide upper limit database 220.

For example, when a guide upper limit corresponding to an action option of "event participation" in a time slot of "18:00 to 20:00" is stored in the guide upper limit database 220, the estimated number for the same action option is stored in the estimated number database 240.

Next, the map database 250 and the transportation operation database 260 according to the present embodiment will be described.

The map database 250 according to the present embodiment stores information related to roads. The information related to roads is, for example, information represented as networks including nodes and links. The information related to roads includes intersections and various points of interest (POIs), their latitude and longitude, road lengths and widths, the presence of traffic lights, and road traffic control information. Also, the information related to roads may include road traffic information obtained in real time by various types of in-vehicle sensors. Further, the traffic information may include time required for passing sections of roads.

The transportation operation database 260 according to the present embodiment stores information related to operations of transit systems. The information related to operations of transit systems includes boarding/exiting places of stations and bus stops, lines connecting between the boarding/exiting places, and information related to transfers between lines. Further, the information related to operations of transit systems includes information related to prices such as fares, timetable information about departure times and arrival times of the boarding/exiting places, and a capacity of passengers per car.

Next, referring to FIG. 8, functions of the apparatus and the device included in the congestion management system 100 according to the present embodiment will be described.

Figure 8:
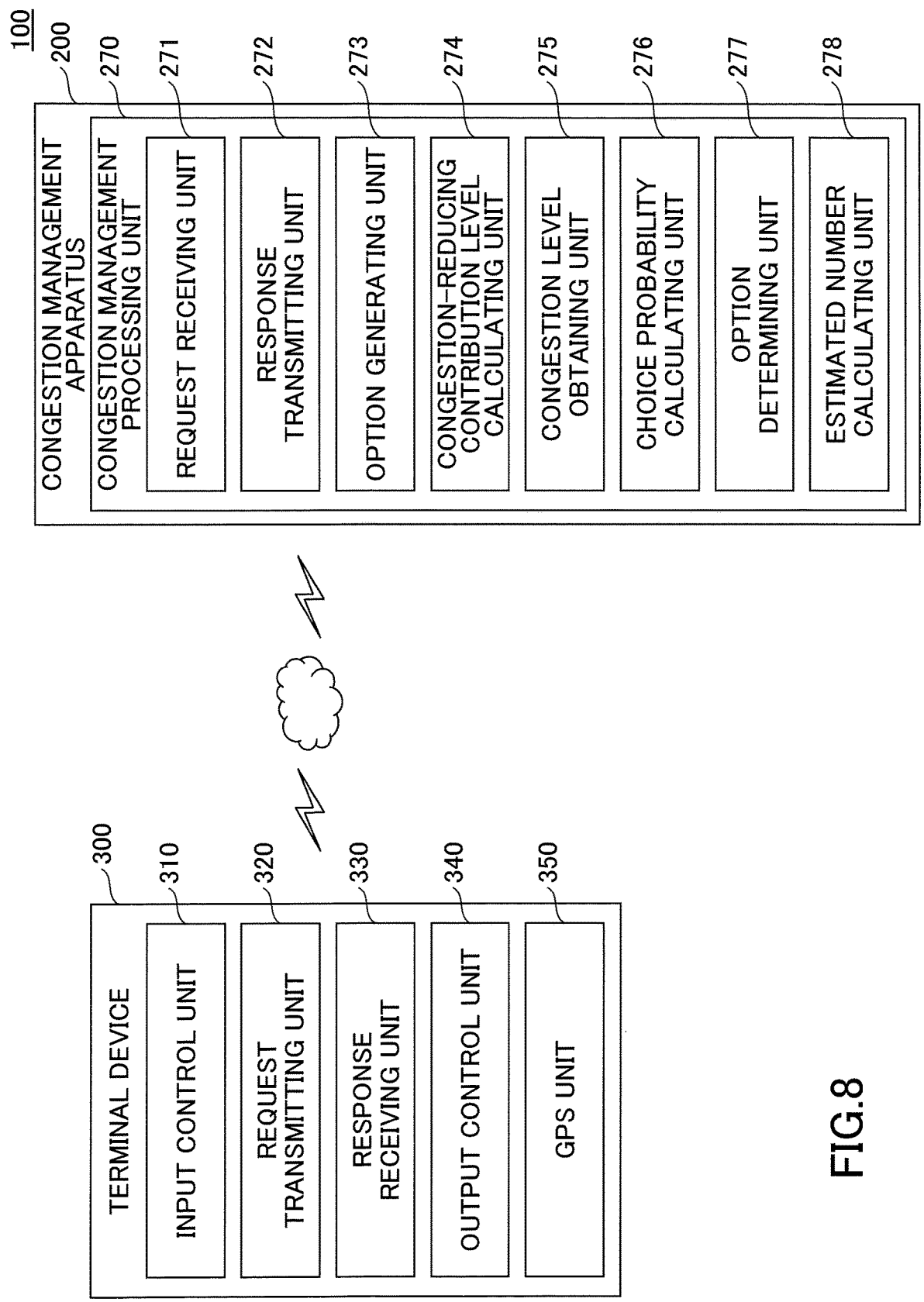
FIG. 8 is a drawing illustrating functions of the apparatus and a terminal device included in the congestion management system according to the first embodiment.

FIG. 8 is a drawing illustrating the functions of the apparatus and the terminal device included in the congestion management system.

In the congestion management system 100 according to the present embodiment, the congestion management apparatus 200 includes the congestion management processing unit 270. The congestion management processing unit 270 according to the present embodiment is implemented by causing the processing device 26 of the congestion management apparatus 200 to execute the congestion management program installed in the congestion management apparatus 200.

The congestion management processing unit 270 according to the present embodiment includes a request receiving unit 271, a response transmitting unit 272, an option generating unit 273, a congestion-reducing contribution level calculating unit 274, a congestion level obtaining unit 275, a choice probability calculating unit 276, an option determining unit 277, and an estimated number calculating unit 278.

The request receiving unit 271 according to the present embodiment receives a presentation request transmitted from the terminal device 300. The presentation request includes specified conditions such as a user ID, an action date, a desired action start time, a desired action end time, and an action start location. For example, when an action option is a transit option, a presentation request includes a user ID, a date on which transportation is used, a desired departure time or a desired arrival time, a departure location, and a destination location.

The response transmitting unit 272 transmits action options determined by the option determining unit 277 to the terminal device 300.

The option generating unit 273 refers to timetables of various transit systems stored in the transportation operation database 260, and generates, as action options, transit options from the departure location to the destination location based on the presentation request.

The congestion-reducing contribution level calculating unit 274 refers to the guide upper limit database 220 and the estimated number database 240, and calculates congestion-reducing contribution levels of the respective action options generated by the option generating unit 273. A method for calculating a congestion-reducing contribution level will be described later in detail.

The congestion level obtaining unit 275 refers to the congestion level database 230, and obtains the congestion levels of the respective action options generated by the option generating unit 273.

The choice probability calculating unit 276 calculates choice probabilities of the respective action options. The choice probability represents a probability that an action option is selected by a user. In other words, for each subset of a group of the action options generated by the option generating unit 273, the choice probability calculating unit 276 calculates choice probabilities of the respective action options included in each of the subsets. A method for calculating a choice probability by the choice probability calculating unit 276 will be described later in detail.

The option determining unit 277 determines action options to be output to the terminal device 300 based on the choice probabilities calculated by the choice probability calculating unit 276 and also based on the congestion-reducing contribution levels calculated by the congestion-reducing contribution level calculating unit 274. To be more specific, the option determining unit 277 calculates expected values of the respective action options generated by the option generating unit 273 based on the congestion-reducing contribution levels and also based on the choice probabilities. Subsequently, the option determining unit 277 obtains a set P of action options having the highest expected value of the congestion-reducing contribution level. The option determining unit 277 determines the set P of action options as action options to be output to the terminal device 300.

When the action options are determined by the option determining unit 277, the estimated number calculating unit 278 determines the estimated numbers of the users assumed to have been previously guided to the respective action options, and updates the estimated number database 240. A method for calculating the estimated number will be described later in detail.

The terminal device 300 according to the present embodiment includes an input control unit 310, a request transmitting unit 320, a response receiving unit 330, an output control unit 340, and a GPS (Global Positioning System) unit 350. These units are implemented by causing a processing device of the terminal device 300 to execute programs installed in the terminal device 300.

The input control unit 310 according to the present embodiment receives input of various types of information. The request transmitting unit 320 transmits, to the congestion management apparatus 200, a presentation request in accordance with the input.

The response receiving unit 330 receives a response to the presentation request transmitted from the request transmitting unit 320. To be more specific, the response receiving unit 330 receives information indicating action options transmitted from the congestion management apparatus 200.

The output control unit 340 causes the display operation device of the terminal device 300 to display the information included in the response received by the response receiving unit 330. To be more specific, the output control unit 340 causes the display operation device to display the action options received by the response receiving unit 330.

The GPS unit 350 receives position information indicating the current position of the terminal device 300 based on a GPS signal received by the terminal device 300.

In the terminal device 300 according to the present embodiment, the request transmitting unit 320 may transmit, instead of a departure location, position information obtained from the GPS unit 350 together with a presentation request to the congestion management apparatus 200.

Next, action options according to the present embodiment will be described prior to describing operations of the congestion management apparatus 200 and the terminal device 300 according to the present embodiment.

FIG. 9 is a drawing illustrating action options according to the first embodiment. In the present embodiment, as illustrated in a table 91, a set of action options of transiting by a transit system n in a time slot l is represented as $P_{n, l}$. To be more specific, an action option of transiting by railway M in a time slot l=0 is represented as $p_{M, 0}$. In the following, an individual action option is represented as $p_{n, l}$, and a set of action options is represented as $P_{n, l}$.

Herein, a set of transit systems n is represented as a set N. A set of time slots l is represented as a set L. A set of action options of all combinations of transit systems n and time slots is represented as a set P. Also, when a set of feasible action options is represented as a set F and a set of action options to be output to the terminal device 300 is represented as a set A, the sets P, F, and A have a relationship indicated by the following formula (1).

$$A \subseteq F \subseteq P = \{p_{n,l}\}$$ Formula (1)

$$n \in N, l \in L$$

$N$: set of transit systems $\{M, B, T\}$ $L$: set of time slots

The set F of the feasible action options is a set of action options that are provided with transit systems in each time slot and that have estimated numbers not reaching respective guide upper limits. Also, the set F is a subset of the set P. Further, the set A of the action options to be output to the terminal device 300 is a set of action options to be presented to the user of the congestion management system 100.

Next, operations of the units included in the congestion management system 100 according to the present embodiment will be described. First, referring to FIG. 10, an operation of the terminal device 300 will be described.

Figure 10:
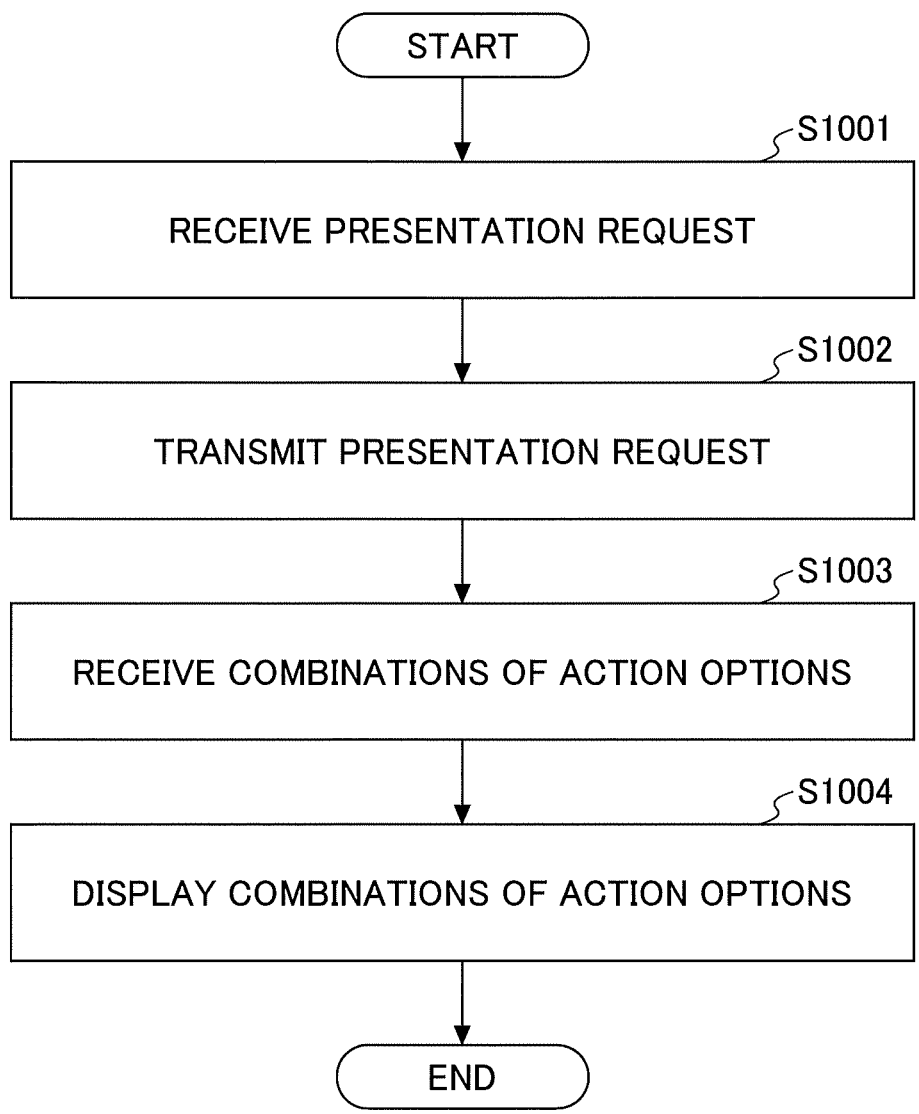
FIG. 10 is a flowchart illustrating an operation of the terminal device according to the first embodiment.

FIG. 10 is a flowchart illustrating the operation of the terminal device 300 according to the first embodiment.

When the input control unit 310 of the terminal device 300 according to the present embodiment receives a request for presenting action options from a user (step S1001), the request transmitting unit 320 transmits the presentation request to the congestion management apparatus 200 (step S1002). At this time, the terminal device 300 may transmit a departure location, a destination location, and a desired departure time or a desired arrival time, which are input along with the presentation request, to the congestion management apparatus 200. Further, the terminal device 300 transmits a user ID of a user of the terminal device 300 together with the presentation request to the congestion management apparatus 200.

Further, if no departure location is input, the terminal device 300 may transmit, instead of a departure location, position information of the terminal device 300 obtained by the GPS unit 350 to the congestion management apparatus 200. Further, if no departure time is input, the terminal device 300 may obtain the current time from a clock function of the terminal device 300, and may transmit the current time instead of a departure time to the congestion management apparatus 200.

Next, the terminal device 300 receives information indicating combinations of action options from the response receiving unit 330 (step S1003). Next, the output control unit 340 of the terminal device 300 causes the display operation device to display the combinations of action options indicated by the received information (step S1004). The process ends.

Figure 11:
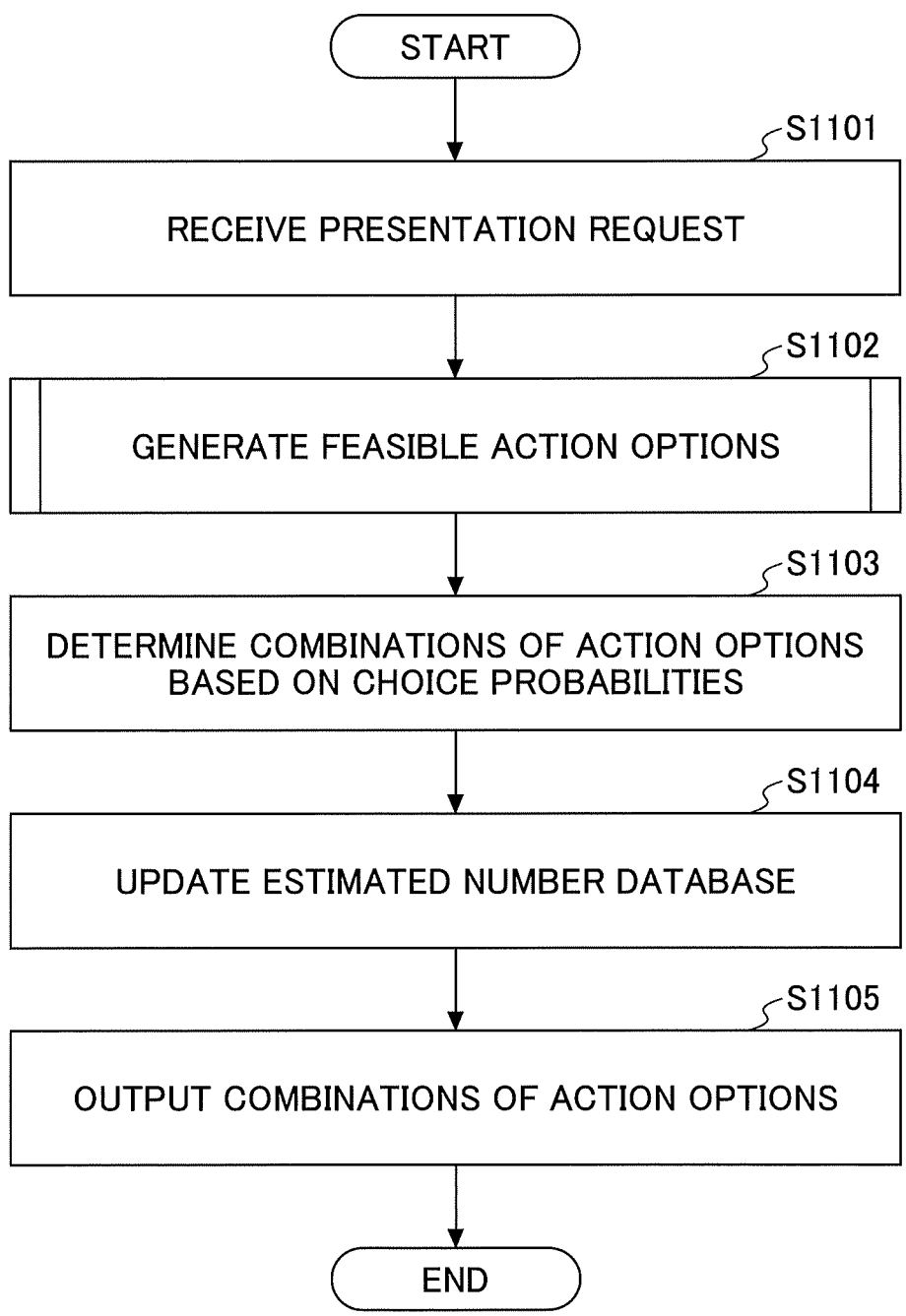
FIG. 11 is a flowchart illustrating an operation of the congestion management apparatus 200 according to the first embodiment.

Next, referring to FIG. 11, an operation of the congestion management apparatus 200 according to the present embodiment will be described. FIG. 11 is a flowchart illustrating the operation of the congestion management apparatus 200 according to the first embodiment.

The request receiving unit 271 of the congestion management processing unit 270 in the congestion management apparatus 200 receives a request for presenting action options from the terminal device 300 (step S1101). To be more specific, the request receiving unit 271 receives a desired departure time, a departure location, and a destination location along with a request for presenting action options from the terminal device 300. The request receiving unit 271 may receive the current time as a desired departure time. Also, the request receiving unit 271 may receive position information of the terminal device 300 instead of a departure location.

The congestion management apparatus 200 according to the present embodiment also receives a user ID of the user of the terminal device 300 together with the presentation request.

Next, the option generating unit 273 of the congestion management processing unit 270 generates feasible action options (step S1102).

A set F of the generated feasible action options is a subset of a set P. The set P is a set of action options including all combinations of transit systems n and time slots l. In other words, the set F is a set of action options that are provided with transit systems in each time slot and that have estimated numbers not reaching respective guide upper limits.

Next, the choice probability calculating unit 276 and the option determining unit 277 of the congestion management processing unit 270 determine combinations of action options based on choice probabilities (step S1103). In other words, the congestion management processing unit 270 selects, from subsets A of the set F of the action options, a set A* of action options to be displayed on the terminal device 300. Step S1103 will be described later in detail.

Next, based on the choice probabilities of the respective action options determined to be presented to the user by the estimated number calculating unit 278, the estimated number calculating unit 278 of the congestion management processing unit 270 calculates the estimated numbers for the respective action options. Then, the estimated number calculating unit 278 updates the estimated number database 240 (step S1104).

Next, the response transmitting unit 272 of the congestion management processing unit 270 outputs the set A* of the action options determined by the response transmitting unit 272 to the terminal device 300 (step S1105). The process ends.

Figure 12:
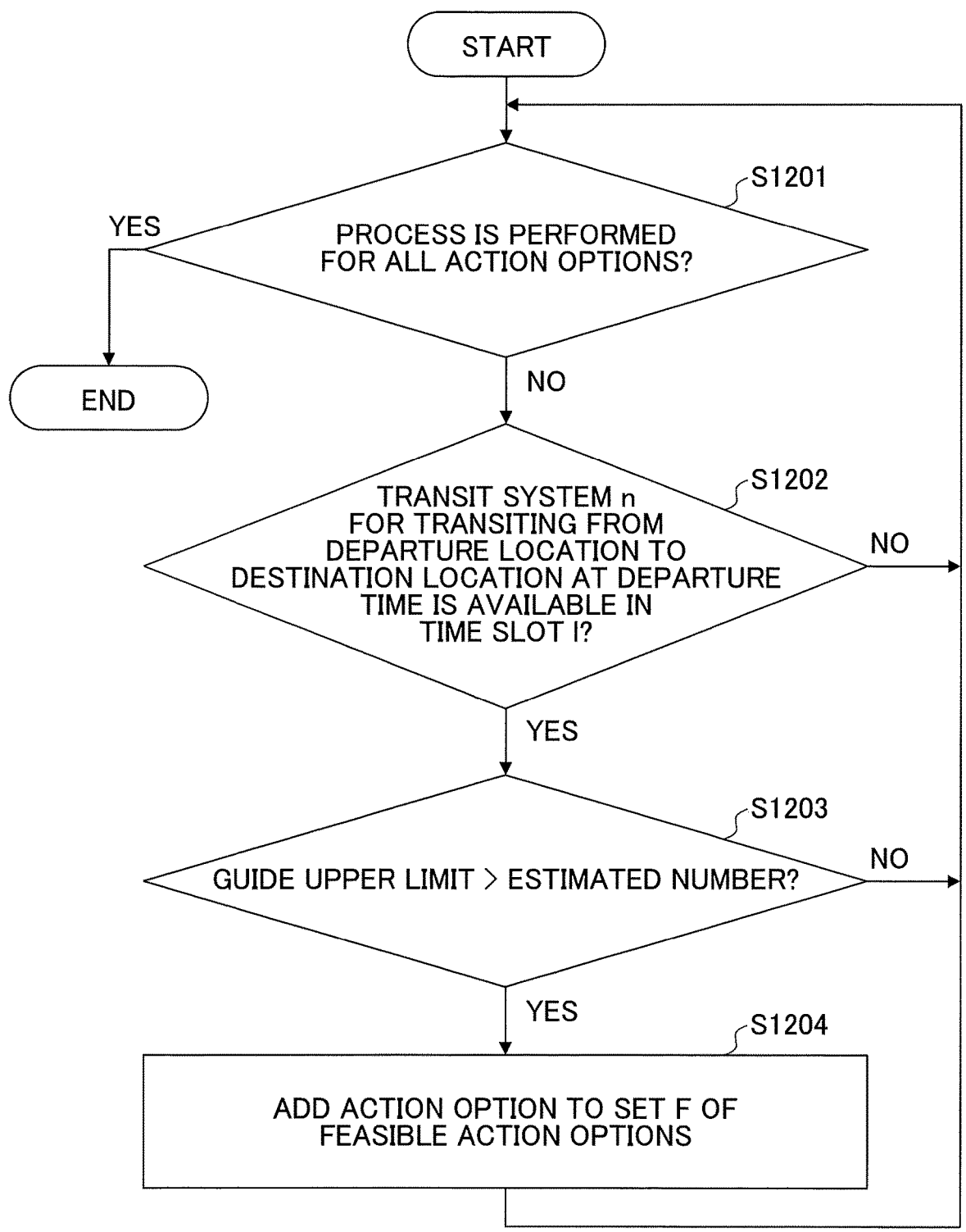
FIG. 12 is a flowchart illustrating a process of an option generating unit according to the first embodiment.

Next, referring to FIG. 12, a process of the option generating unit 273 according to the present embodiment will be described. FIG. 12 is a flowchart illustrating the process of the option generating unit according to the first embodiment.

The option generating unit 273 according to the present embodiment determines whether the process as of step S1202 is performed for all action options $p_{n,l}$ (step S1201). In step S1201, when the process as of step S1202 is performed for all the action options $p_{n,l}$, the process ends.

When the process is not performed for all the action options $p_{n,l}$, the option generating unit 273 refers to the map database 250 and the transportation operation database 260, and determines whether a transit system n for transiting from a departure location to a destination location at a desired departure time is available in a time slot l (step S1202). This time slot l is a time slot that is assumed based on the departure time.

In step S1202, when no transit system n is available, the option generating unit 273 causes the process to return to step S1201.

In step S1202, when a transit system n is available, the option generating unit 273 refers to the guide upper limit database 220 and the estimated number database 240, and determines whether the estimated number $C_{n,l}$ is less than a guide upper limit $C^{MAX}_{n,l}$ (step S1203).

In step S1203, when the estimated number $C_{n,l}$ is not less than the guide upper limit $C^{MAX}_{n,l}$, namely when the estimated number $C_{n,l}$ reaches the limit $C^{MAX}_{n,l}$, the option generating unit 273 returns to step S1201.

In step S1203, when the estimated number $C_{n,l}$ is less than the guide upper limit $C^{MAX}_{n,l}$, the option generating unit 273 adds an action option $p_{n,l}$ to a set F of feasible action options (step S1204), and causes the process to return to step S1201.

Now, the estimated number $C_{n,l}$ according to the present embodiment will be described. In the present embodiment, $C_{n,l}$ can be expressed by the following formula (2).

Formula (2)

$$C_{n,l} = \sum_{k=1}^{n_c-1} Prob^{(k)}_{n,l}$$

Formula (2)

The estimated number $C_{n,l}$ represents the number of users assumed to have previously selected an action option $p_{n,l}$. Formula (2) indicates the estimated number $C_{n,l}$ in which the current user is represented as an $n^{th}$ user. A method for calculating a choice probability $Prob_{n,l}(X)$ in the formula (2) will be described later.

As is seen from the formula (2), the estimated number $C_{n,l}$ according to the present embodiment is a value obtained by cumulating choice probabilities $Prob_{n,l}(X)$ of respective action options $p_{n,l}$ for a n-1$^{th}$ user and preceding users when the $n^{th}$ user requests presentation of action options $p_{n,l}$.

As described, the option generating unit 273 according to the present embodiment extracts action options whose estimated numbers do not reach respective guide upper limits, from action options (transit options) searched based on a desired departure time, a departure location, and a destination location. Thus, according to the present embodiment, an action option whose estimated number has reached its guide upper limit is prevented from being selected by users, allowing congestion to be relieved.

Next, a process performed by the congestion management processing unit 270 to determine a set A* of action options (a pattern of action options) based on choice probabilities will be described.

In the present embodiment, a decision variable $x_{n,l}$ is employed to determine whether an action option $P_{n,l}$ is presented to the user. To be more specific, in the present embodiment, when the decision variable $x_{n,l}=1$, the action option $P_{n,l}$ is determined to be presented. Also, in the present embodiment, when the decision variable $x_{n,l}=0$, the action option $P_{n,l}$ is determined not to be presented.

In the present embodiment, an unfeasible action option $P_{n,l}$ is not presented to the user. Thus, for any unfeasible action option $P_{n,l}$, the decision variable $x_{n,l}$ always indicates 0. A matrix X expressed by the following formula (3) is a matrix indicating a candidate set A of action options $P_{n,l}$ to be presented to the user.

Formula (3)

$$X = \{x_{n,l} \mid x_{n,l} \in \{0, 1\}\}$$

$$x_{n,l} = 0 \ \forall \ p_{n,l} \notin F$$

N: set of transit systems $\{M, B, T\}$

L: set of time slots

Formula (3)

The option determining unit 277 according to the present embodiment determines, as a set A* of action options to be presented to the user, a set A of action options having the highest congestion-reducing contribution level calculated by the congestion-reducing contribution level calculating unit 274. This is formulated as an optimization problem as indicated by the following formula (4).

Formula (4)

$$\max_{X} \Sigma_{n \in N} \Sigma_{l \in L} R_{n,l} Prob_{n,l}(X) \qquad \text{Formula (4)}$$

$$\text{s.t. } x_{n,l} = 0 \ \forall \ p_{n,l} \notin F$$

In the formula (4) above, $Prob_{n,l}(X)$ denotes a choice probability of an action option $p_{n,l}$ included in a set A of action options indicated by a matrix X. This choice probability is calculated by the choice probability calculating unit 276.

In the formula (4) above, $R_{n,l}$ denotes a congestion-reducing contribution level that can be obtained when the action option $p_{n,l}$ is selected from the set A of the action options. This congestion-reducing contribution level is calculated by the congestion-reducing contribution level calculating unit 274 by using the following formula (5), for example.

Formula (5)

$$R_{n,l} = 1 - \frac{C_{n,l}}{C_{n,l}^{MAX}} \qquad \text{Formula (5)}$$

$C_{n,l}$ denotes the estimated number associated with the action option $p_{n,l}$ in the estimated number database 240. $C^{MAX}_{n,l}$ indicates a guide upper limit associated with the action option $p_{n,l}$ in the guide upper limit database 220.

According to the present embodiment, as is seen from the formula (5), as an action option $p_{n,l}$ having a smaller ratio of the estimated number to a guide upper limit is selected, a value of a congestion-reducing contribution level $R_{n,l}$ increases.

Namely, as an action option $p_{n,l}$ having a larger difference between a guide upper limit $C^{MAX}_{n,l}$ and the estimated number $C_{n,l}$ is selected, a value of a congestion-reducing contribution level $R_{n,l}$ increases. The congestion-reducing contribution level $R_{n,l}$ may be calculated by using a formula different from the above formula.

The option determining unit 277 according to the present embodiment calculates a product by multiplying a choice probability $Prob_{n,l}(X)$ by a congestion-reducing contribution level $R_{n,l}$ for each action option $p_{n,l}$ included in a set A of action options indicated by a matrix X. The product obtained by multiplying the choice probability $Prob_{n,l}(X)$ by the congestion-reducing contribution level $R_{n,l}$ is an expected value of the congestion-reducing contribution level for each of the action options $p_{n,l}$.

The option determining unit 277 calculates an expected value of a congestion-reducing contribution level for each action option $p_{n,l}$ included in a set A indicated by a matrix X. The option determining unit 277 obtains the sum of the expected values and sets the sum as an expected value of a congestion-reducing contribution level of the set A. The option determining unit 277 determines, from among sets A, a set A having the highest expected value of the congestion-reducing contribution level as a set A*. Accordingly, action options $p_{n,l}$ included in the set A* are presented to the user.

Next, a calculation of a choice probability $Prob_{n,l}(X)$ by the choice probability calculating unit 276 will be described.

In the present embodiment, it is assumed that a user selects an action option $p_{n,l}$ according to a multinomial logit model (MNL). Accordingly, when a set A indicated by a matrix X is presented to the user, a probability (choice probability) $Prob_{n,l}(X)$ that an action option $p_{n,l}$ is selected by the user is calculated by the following formula (6).

Formula (6)

$$Prob_{n,l}(X) = \frac{x_{n,l} \exp(V_{n,l})}{\sum_{n' \in N} \sum_{l' \in L} x_{n',l'} \exp(V_{n',l'})} \qquad \text{Formula (6)}$$

X: decision variable $$X = \{x_{n,l}\} \ x_{n,l} = \begin{cases} 1 \\ 0 \end{cases}$$

In the formula (6), $V_{n,l}$ denotes utility of the action option $p_{n,l}$. Utility $V_{n,l}$ can be calculated by the following formula (7), for example.

$$V_{n,l} = ASC_n + \beta_{fare} \times \text{fare} + \beta_{TT} \times TT + \beta_{DT} \times DT + \beta_{CG} \times CG \qquad \text{Formula (7)}$$

ASC: alternative-specific constant
fare: fare
TT: transit time
CG: congestion level
DW: waiting time To be more specific, the choice probability calculating unit 276 refers to the user database 210 and obtains user information corresponding to a user ID obtained from the terminal device 300. Then, the choice probability calculating unit 276 substitutes each value included in the user information into the formula (7).

Further, the choice probability calculating unit 276 may refer to the transportation operation database 260, obtain a value indicating a fare required for a transit system, and substitute the value into the formula (7).

Further, the choice probability calculating unit 276 may cause the congestion level obtaining unit 275 to refer to the congestion level database 230 and to obtain a congestion level associated with the action option $p_{n,l}$. Then, the choice probability calculating unit 276 may substitute the congestion level into the formula (7). Further, based on a desired departure time input in the terminal device 300 and time slots of the action option $p_{n,l}$, the choice probability calculating unit 276 may calculate a waiting time and may substitute the waiting time into the formula (7).

Figure 13:
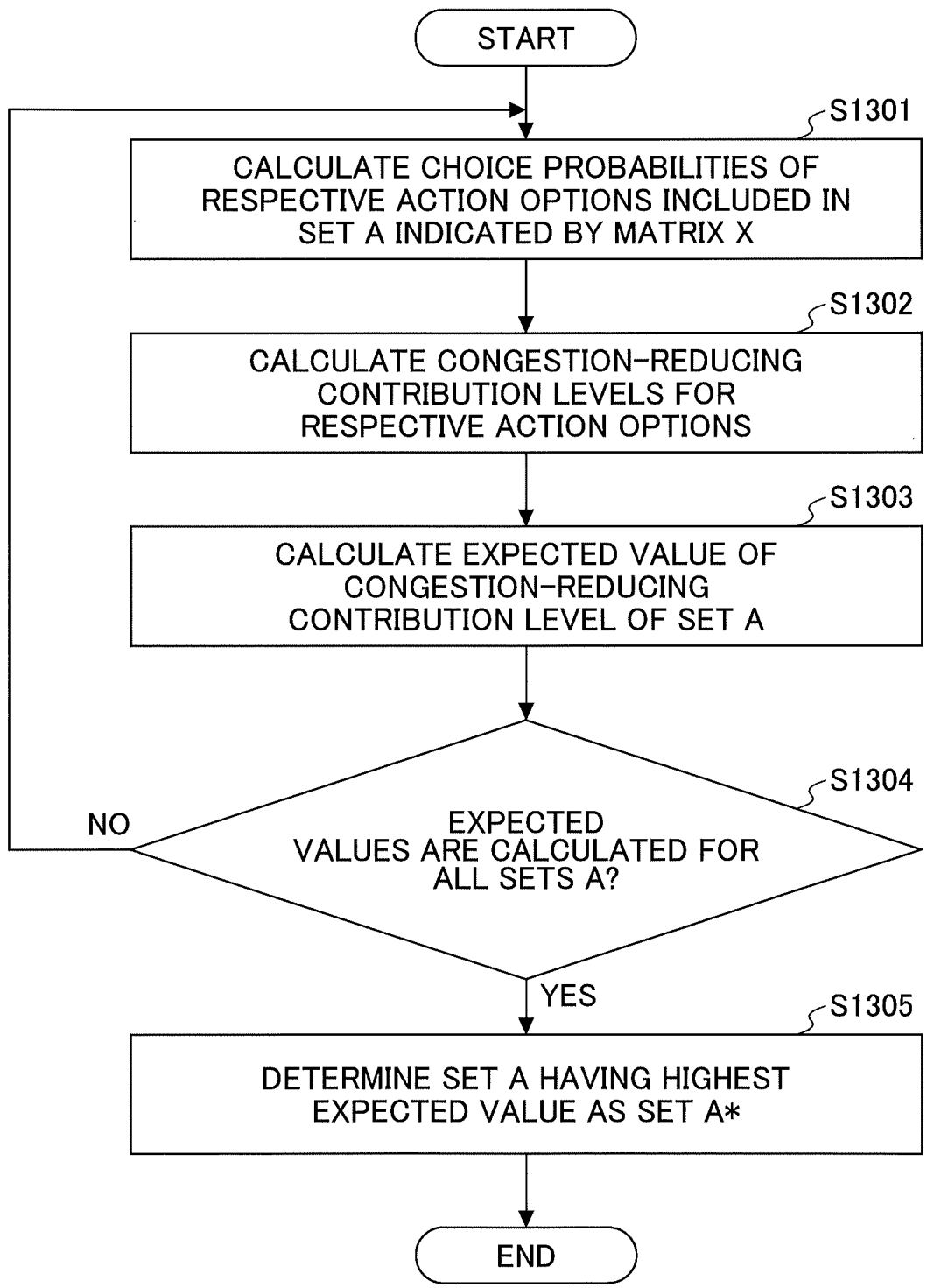
FIG. 13 is a drawing illustrating a process for determining a set of action options based on choice probabilities according to the first embodiment.

Referring to FIG. 13, determination of a set (combination) A* of action options based on choice probabilities will be described in more detail below. FIG. 13 is a drawing illustrating a process for determining a set of action options based on choice probabilities.

The process illustrated in FIG. 13 indicates a calculation process performed in step S1103 of FIG. 11.

When feasible action options $P_{n,l}$ are generated by the option generating unit 273, the choice probability calculating unit 276 calculates choice probabilities of the respective action options $p_{n,l}$ in a set A (in an action option group $P_{n,l}$) indicated by a matrix X (step S1301).

To be more specific, the choice probability calculating unit 276 refers to the user database 210 and obtains user information associated with a user ID. Also, the choice probability calculating unit 276 refers to the congestion level database 230, and obtains congestion levels of the respective action options $p_{n,l}$, namely congestion levels of respective transit systems n in time slots l. Then, the choice probability calculating unit 276 calculates utility $V_{n,l}$ by the formula (7).

Namely, the choice probability calculating unit 276 calculates values indicating satisfaction levels of the user with respect to the respective action options $p_{n,l}$ included in the set A.

Next, the choice probability calculating unit 276 calculates choice probabilities $\text{Prob}_{n,l}(X)$ by the formula (6).

Namely, based on the values indicating the satisfaction levels of the user with respect to the respective action options $p_{n,l}$ included in the set A, the choice probability calculating unit 276 according to the present embodiment calculates choice probabilities of the respective action options action options $p_{n,l}$.

In other words, in the present embodiment, as a satisfaction level of an action option $p_{n,l}$ that can be obtained by the user becomes higher, a choice probability becomes higher.

Next, the congestion-reducing contribution level calculating unit 274 calculates congestion-reducing contribution levels $R_{n,l}$ for the respective action options $p_{n,l}$ in the set A (step S1302).

To be more specific, the congestion-reducing contribution level calculating unit 274 refers to the guide upper limit database 220 and the estimated number database 240, and obtains guide upper limits $C^{MAX}_{n,l}$ associated with the respective action options $p_{n,l}$ and also obtains estimated numbers $C_{n,l}$ associated with the respective action options $p_{n,l}$. Then, the congestion-reducing contribution level calculating unit 274 calculates congestion-reducing contribution levels $R_{n,l}$ by the formula (5).

Next, based on the choice probability $\text{Prob}_{n,l}(X)$ and the congestion-reducing contribution level $R_{n,l}$ calculated for each of the action options $p_{n,l}$, the option determining unit 277 calculates an expected value of a congestion-reducing contribution level of the set A (step S1303).

To be more specific, the option determining unit 277 calculates an expected value of the congestion-reducing contribution level for each of the action options $p_{n,l}$. The expected value is a product obtained by multiplying the choice probability $\text{Prob}_{n,l}(X)$ by the congestion-reducing contribution level $R_{n,l}$ by using the formula (4). Then, the option determining unit 277 obtains the sum of the expected values of the action options $p_{n,l}$ as an expected value of a congestion-reducing contribution level of the set A.

Next, the option determining unit 277 determines whether expected values of sets A that can be obtained from the set F of the feasible action options $p_{n,l}$ are calculated (step S1304). In step S1304, when the expected values of all the sets A are not calculated, the option determining unit 277 causes the process to return to S1301.

In step S1304, when the expected values of all the sets A are calculated, the option determining unit 277 determines, as a set A* of action options $p_{n,l}$ to be presented to the terminal device 300, a set A having the highest expected value of the congestion-reducing contribution level (step S1305). The process ends.

In the following, referring to FIG. 14 and FIGS. 15A through 15C, a process for determining a set A* will be described in detail.

FIG. 14 is a first drawing illustrating an example of a set of feasible action options.

In the example of FIG. 14, a combination of a transit system n and a time slot l indicated by a circle mark is an action option whose estimated number $C_{n,l}$ is less than a guide upper limit $C^{MAX}_{n,l}$, and thus is a feasible action option $p_{n,l}$. In the example of FIG. 14, a combination of a transit system n and a time slot l indicated by a cross mark is an action option whose estimated number $C_{n,l}$ reaches a guide upper limit $C^{MAX}_{n,l}$, and thus is an unfeasible action option $p_{n,l}$.

In the example of FIG. 14, as feasible action options $p_{n,l}$, an action option of n=railway M and l=1, an action option of n=railway M and l=2, and an action option of n=railway M and l=3 are generated. Also, in the example of FIG. 14, as feasible action options $p_{n,l}$, an action option of n=bus B and l=1 and an action option of n=bus B and l=3 are generated. Also, in the example of FIG. 14, as feasible action options $p_{n,l}$, an action option of n=taxi and l=0, an action option of n=taxi and l=2, and an action option of n=taxi and l=3 are generated.

Namely, in the example of FIG. 14, a set A of the feasible action options $p_{n,l}$ includes $p_{Meto,1}$, $p_{Meto,2}$, $p_{Meto,3}$, $p_{B,1}$, $p_{B,3}$, $p_{T,0}$, $p_{T,2}$, and $p_{T,3}$.

FIGS. 15A through 15C are second drawings illustrating an example of the set of the feasible action options. In FIGS. 15A through 15C, among the action options $p_{n,l}$ included in the set A illustrated in FIG. 14, a candidate set of action options $p_{n,l}$ to be presented to the user are represented as a matrix X arranged in n rows and l columns.

FIG. 15A illustrates a pattern in which all the action options $p_{n,l}$ indicated by the circle marks are presented to the user.

In this case, a table Pr-1 illustrates information indicating choice probabilities $\text{Prob}_{n,l}(X)$ associated with the respective action options $p_{n,l}$.

As illustrated in the table Pr-1, the choice probability calculating unit 276 does not present any action option $p_{n,l}$ that corresponds to an element of "0" in the matrix X. Thus, a choice probability thereof is not calculated.

As illustrated in the table Pr-1, upon the probabilities $\text{Prob}_{n,l}(X)$ of the respective action options $p_{n,l}$ being calculated, the option determining unit 277 according to the present embodiment calculates expected values of congestion-reducing contribution levels. The expected values are products obtained by multiplying the choice probabilities $\text{Prob}_{n,l}(X)$ by the respective congestion-reducing contribution levels. Then, the option determining unit 277 obtains the sum of the products as an expected value of a congestion-reducing contribution level of the set F. This expected value is an expected value of a congestion-reducing contribution level calculated based on the choice probabilities indicated in the table Pr-1, and is also an expected value of the set A of the action options $p_{n,l}$ indicated by the matrix X and to be presented to the user.

FIG. 15B illustrates a pattern in which, among the action options $p_{n,l}$ indicated by the circle marks, the action option $p_{T,0}$ is excluded from action options to be presented to the user. Thus, a value of a corresponding element in the matrix X is "0".

In this case, a table Pr-2 illustrates information indicating choice probabilities $\text{Prob}_{n,l}(X)$ of the respective action options $p_{n,l}$. In the table Pr-2, a choice probability of the action option $p_{T,0}$ corresponding to "n=taxi T and l=0" is not calculated. Similarly to FIG. 15A, the option determining unit 277 calculates an expected value of a congestion-reducing contribution level based on the choice probabilities indicated in the table Pr-2.

FIG. 15C illustrates a pattern in which, among the action options $p_{n,l}$ indicated by the circle marks, the action option $p_{M,1}$ is excluded from action options to be presented to the user. Thus, a value of a corresponding element in the matrix X is "0".

In this case, a table Pr-3 illustrates information indicating choice probabilities $\text{Prob}_{n,l}(X)$ of the respective action options $p_{n,l}$. In the table Pr-3, a choice probability of the action option $p_{M,1}$ corresponding to "n=railway M and l=1" is not calculated. Similarly to FIG. 15A, the option determining unit 277 calculates an expected value of a congestion-reducing contribution level based on the choice probabilities indicated in the table Pr-3.

In the present embodiment, as described above, expected values of congestion-reducing contribution levels are calculated for all possible patterns (sets A) of action options $p_{n,l}$.

In the example of FIG. 15A, the number of the feasible action options $p_{n,l}$ is 8, and the matrix X has "0" and "1" as values of elements corresponding to the respective action options $p_{n,l}$. Accordingly, the determining unit 277 calculates expected values of congestion-reducing contribution levels for 2 to the power of 8 patterns.

In a pattern having the highest expected value of the congestion-reducing contribution level, the option determining unit 277 determines a set A of action options $p_{n,l}$ whose corresponding elements have values of "1" as a set A* of action options to be presented to the user.

At this time, the option determining unit 277 causes the terminal device 300 to display the action options $p_{n,l}$ included in the pattern having the highest expected value in descending order of choice probability $\text{Prob}_{n,l}(X)$.

Further, the congestion management apparatus 200 according to the present embodiment may transmit congestion levels associated with the respective action options $p_{n,l}$ to the terminal device 300. For each of the action options $p_{n,l}$, the terminal device 300 may display information indicating congestion status of a corresponding congestion level.

Figure 16:
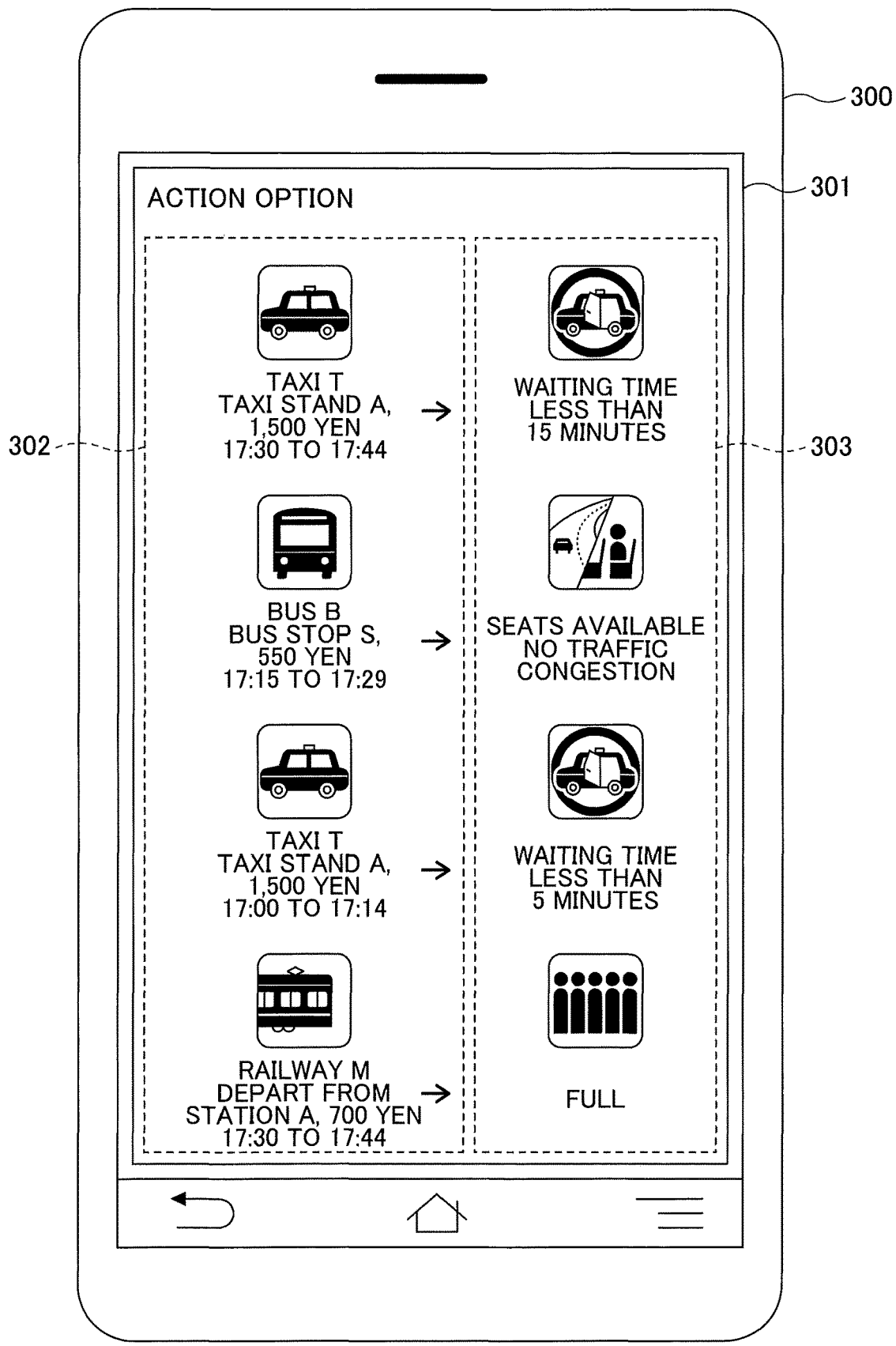
FIG. 16 is a drawing illustrating an example of action options displayed on the terminal device according to the first embodiment.

Referring to FIG. 16, an example in which action options $p_{n,l}$ are displayed on the terminal device 300 will be described below. FIG. 16 is a drawing illustrating an example of action options displayed on the terminal device according to the first embodiment.

FIG. 16 illustrates the example in which the pattern illustrated in FIG. 15A having the highest expected value of the congestion-reducing contribution level is displayed on a screen of the terminal device 300.

A screen 301 illustrated in FIG. 16 includes a display field 302 and a display field 303. The display field 302 displays action options. The display field 303 displays information indicating congestion status of each of the action options.

An action option $p_{n,l}$ of "transiting by taxi T between 17:30 and 17:44," which has the highest choice probability $\text{Prob}_{n,l}(X)$ in the table Pr-1, is displayed at the top of the display field 302. Also, information indicating congestion status equivalent to the congestion level 2, which is associated with the action option of "transiting by taxi T between 17:30 and 17:44," is displayed in the display field 303.

Also, in the display field 302, an action option $p_{n,l}$ of "transiting by bus B between 17:15 and 17:29," which has the second highest choice probability $\text{Prob}_{n,l}(X)$ in the table Pr-1, is displayed next.

Also, information indicating congestion status equivalent to the congestion level 2, which is associated with the action option of "transiting by bus B between 17:15 and 17:29," is displayed in the display field 303. For example, the congestion level database 230 may store information indicating congestion status associated with a corresponding congestion level of each transit system.

In the example of FIG. 16, the terminal device 300 displays the action options in descending order of choice probability; however, the present embodiment is not limited thereto. In the present embodiment, for example, the terminal device 300 may display action options in order from the highest expected value of a congestion-reducing contribution level.

According to the present embodiment, action options to be displayed on the terminal device 300 of the user are determined based on choice probabilities and also based on congestion-reducing contribution levels for respective action options. The choice probabilities are each calculated based on a value indicating a satisfaction level.

Thus, according to the present embodiment, it is possible to present an action option that takes into account both a probability of being selected by a user and contribution to relieving congestion.

Further, in the present embodiment, the estimated number database 240 is updated every time a request for presentation of action options is made by each user of the terminal device 300. Thus, according to the present embodiment, a user requesting presentation of action options can be provided with action options that take into account the latest congestion status. Further, according to the present embodiment, by updating the estimated number database 240 every time a request for presentation of action options is made, it is possible to prevent the same action options from being continuously presented. As a result, congestion can be relieved.

Second Embodiment

In the following, a second embodiment will be described with reference to the drawings. The second embodiment differs from the first embodiment in that an action option presented to a user is determined based on a sales contribution level instead of a congestion-reducing contribution level. In the following second embodiment, only differences from the first embodiment will be described. Elements having the same functions or configurations as those in the first embodiment are referred to by the same numerals used in the first embodiment, and a description thereof will be omitted.

Figure 17:
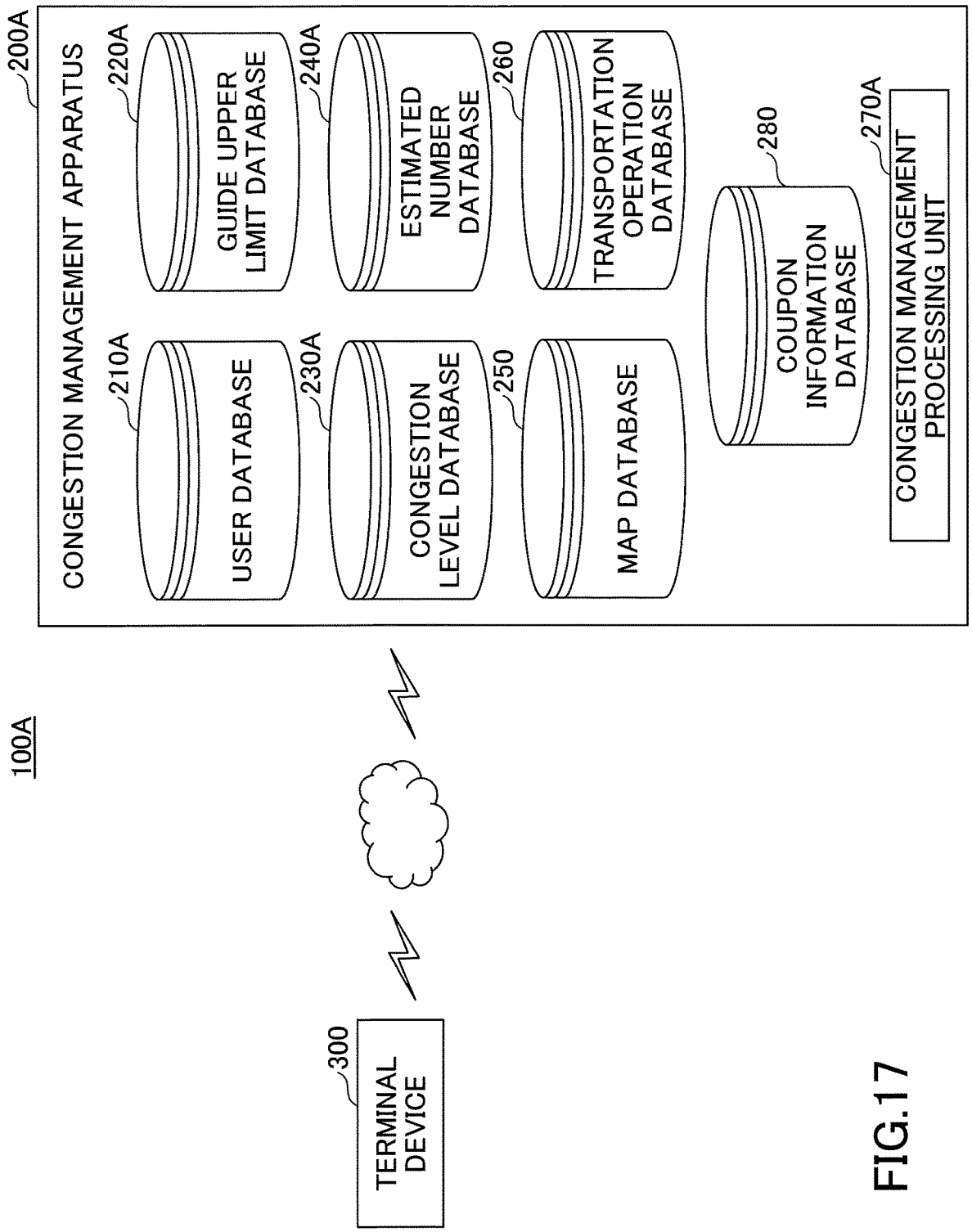
FIG. 17 is a drawing illustrating a system configuration of a congestion management system according to a second embodiment.

FIG. 17 is a drawing illustrating a system configuration of a congestion management system according to the second embodiment.

A congestion management system 100A according to the present embodiment includes the terminal device 300 and a congestion management apparatus 200A.

The congestion management apparatus 200A according to the present embodiment includes a user database 210A, a guide upper limit database 220A, a congestion level database 230A, and an estimated number database 240A. Further, the congestion management apparatus 200A according to the present embodiment includes the map database 250, the transportation operation database 260, and a coupon information database 280. Also, the congestion management apparatus 200A according to the present embodiment includes a congestion management processing unit 270A.

The congestion management processing unit 270A according to the present embodiment outputs, to the terminal device 300, an action option that combines a transit action by transportation with a purchase action at a store. Further, in the present embodiment, an action option that takes into account a contribution level with respect to sales from a purchase action is output to the terminal device 300. Sales from a purchase action are, for example, sales of a store presented as a drop-in place.

In the example of FIG. 17, the map database 250, the transportation operation database 260, and the coupon information database 280 are included in the congestion management apparatus 200A; however, the present embodiment is not limited thereto. The map database 250, the transportation operation database 260, and the coupon information database 280 may be included in an apparatus other than the congestion management apparatus 200A. Also, the map database 250, the transportation operation database 260, and the coupon information database 280 may be individually included in separate apparatuses.

Referring to FIG. 18 through FIG. 22, the databases included in the congestion management apparatus 200A according to the present embodiment will be described below.

FIG. 18 is a drawing illustrating an example of the user database according to the second embodiment. The user database 210A according to the present embodiment includes an item "$\beta_i$" in addition to the items included in the user database 210 according to the first embodiment.

The item "$\beta_i$" represents weight given to a monetary value provided to an action corresponding to a selected action option. In other words, the item "$\beta_i$" represents how much a monetary value provided to an action option selected by the user contributes to a satisfaction level of the selected action option.

A monetary value is a coupon, for example. Namely, in a case where the user's action includes dropping in at a store, the item "$\beta_i$" represents how much a coupon having a monetary value contributes to a satisfaction level of the action when provided to the user.

The items other than the item "$\beta_i$" in the user database 210A are the same as those in the user database 210 according to the first embodiment, and a description thereof will be omitted.

FIG. 19 is a drawing illustrating an example of the upper limit database according to the second embodiment. The guide upper limit database 220A according to the present embodiment stores a guide upper limit associated with each combination of a transit system n and a time slot l. Also, the guide upper limit database 220A according to the present embodiment stores a guide upper limit associated with each combination of a store and a time slot l.

Further, in the guide upper limit database 220A of FIG. 19, the number of stores associated with guide upper limits is 1; however, the present embodiment is not limited thereto. The number of stores associated with guide upper limits may be any number. Similarly, the time slots l illustrated in FIG. 19 may also include any time slot.

For example, in the example of FIG. 19, store K has a guide upper limit of 20 in a time slot l=0, and has a guide upper limit of 50 in a time slot l=1.

FIG. 20 is a drawing illustrating an example of the congestion level database according to the second embodiment. The congestion level database 230A according to the present embodiment stores congestion levels of railway M, bus B, taxi T, and store K as a drop-in place in time slots l=0 to 3.

Further, as in FIG. 19, the time slots l, the transit systems n, and the store illustrated in FIG. 20 may include any time slot and any action.

FIG. 21 is a drawing illustrating an example of the estimated number database according to the second embodiment. The estimated number database 240A according to the present embodiment stores estimated numbers for railway M, bus B, taxi T, and store K as a drop-in place in time slots l=0 to 3.

Further, as in FIG. 19, the time slots l, the transit systems n, and the drop-in places illustrated in FIG. 21 may include any time slot and any store.

FIG. 22 is a drawing illustrating an example of the coupon information database according to the second embodiment. The coupon information database 280 according to the present embodiment includes, as information items, "store name," "coupon availability," and "location". The item "store name" indicates a name of a store. The "coupon availability" indicates whether a coupon can be obtained. The "location" indicates a location of a store.

To be more specific, when the item "coupon availability" indicates "available," it means that an incentive such as a coupon that has a monetary value and that can be used at a corresponding store is provided to the user. Namely, when the item "coupon availability" indicates "available," it means that an incentive is provided for a user dropping in at a corresponding store.

When the item "coupon availability" indicates "unavailable," it means that an incentive such as a coupon that has a monetary value and that can be used at a corresponding store is not provided to the user. Namely, when the item "coupon availability" indicates "unavailable," it means that an incentive is not provided for a user dropping in at a corresponding store.

Further, the coupon information database 280 illustrated in FIG. 22 stores information indicating coupon availability on a per-store basis; however, the present embodiment is not limited thereto. In addition to stores, the coupon information database 280 may include facilities and transit systems to which incentives are issued, and also include incentive availability thereof.

For example, in a case where transit by taxi T is selected as an action option and a discount service is available, information that associates transportation "taxi T" with incentive availability indicating "available" may be stored in the coupon information database 280.

Next, referring to FIG. 23, functions of the apparatus and the device included in the congestion management system 100A will be described.

Figure 23:
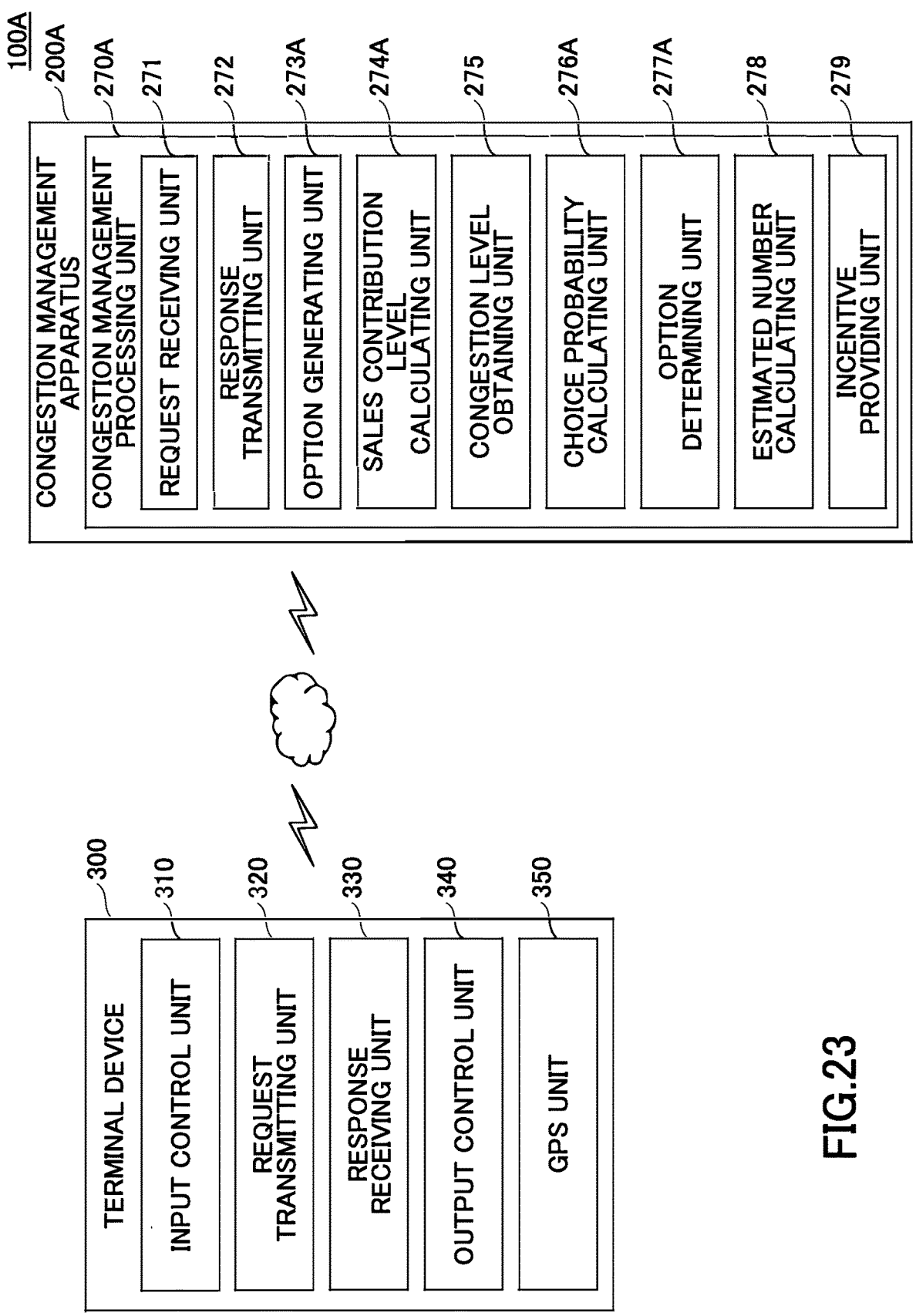
FIG. 23 is a drawing illustrating functions of an apparatus and the terminal device included in the congestion management system according to the second embodiment.

FIG. 23 is a drawing illustrating functions of the apparatus and the terminal device included in the congestion management system according to the second embodiment.

The congestion management processing unit 270 included in the congestion management apparatus 200A according to the present embodiment includes the request receiving unit 271, the response transmitting unit 272, an option generating unit 273A, and a sales contribution level calculating unit 274A. Also, the congestion management processing unit 270A according to the present embodiment includes the congestion level obtaining unit 275, a choice probability calculating unit 276A, an option determining unit 277A, the estimated number calculating unit 278, and an incentive providing unit 279.

Based on a desired departure time, a departure location, and a destination location input into the terminal device 300, the option generating unit 273A according to the present embodiment generates feasible action options. To be more specific, the option generating unit 273A according to the present embodiment refers to the guide upper limit database 220A and the estimated number database 240A, and extracts, from combinations of transit systems n and time slots l, combinations whose estimated numbers are less than respective guide upper limits. Then, from stores that can be combined with the transit systems n in time slots l, the option generating unit 273A extracts stores whose estimated numbers are less than respective guide upper limits, and combines the extracted stores with the transit systems n as action options.

When stores whose estimated numbers are less than respective guide upper limit do not exist, the option generating unit 273A combines transit systems n with time slots l as action options.

The sales contribution level calculating unit 274A according to the present embodiment refers to the coupon information database 280, and calculates sales contribution levels of respective stores in accordance with incentive availability.

A sales contribution level according to the present embodiment indicates how much a selected action option contributes to sales of a commercial facility located within a predetermined range from the position of the terminal device 300.

The choice probability calculating unit 276A according to the present embodiment calculates choice probabilities of the respective action options, based on utility of each of the action options. The utility is calculated by using parameters stored in the user database 210A.

Based on the choice probabilities calculated by the choice probability calculating unit 276A and the sales contribution levels calculated by the sales contribution level calculating unit 274A, the option determining unit 277A according to the present embodiment determines action options to be output to the terminal device 300. To be more specific, the option determining unit 277A calculates expected values of the sales contribution levels based on the sales contribution levels and the choice probabilities of the action options generated by the option generating unit 273A. Then, the option determining unit 277A obtains a set of action options having the highest expected value of a sales contribution level, and determines the action options included in this set to be output to the terminal device 300.

In a case where action options generated by the option generating unit 273A are each combined with a store and also a coupon is available at the store, the incentive providing unit 279 sets an incentive i to "1". To be more specific, in a case where a store is included in an action option and "coupon availability" for the store is "available," the incentive providing unit 279 sets an incentive i to "1". Further, in a case where a store is included in an action option, the incentive providing unit 279 refers to the coupon information database 280 and sets an incentive i to "0" when "coupon availability" for the store is "unavailable".

Functions of the terminal device 300 according to the present embodiment are the same as those described in the first embodiment, and a description thereof will be omitted.

FIGS. 24A and 24B are drawings illustrating action options according to the second embodiment. As illustrated in Tables 91A-1 and 91A-2, the present embodiment includes action options to which incentives are provided and action options to which incentives are not provided. Thus, an action option according to the second embodiment is referred to as an action option $P_{n,l,i}$, where denotes presence or absence of an incentive.

In the present embodiment, i=0 when no incentive i is provided. Thus, as illustrated in Table 91A-1, an action option whose incentive i is 0 is represented as an action option $P_{n,l,0}$.

In the present embodiment, i=1 when an incentive i is provided. Thus, as illustrated in Table 91A-2, an action option whose incentive i is 1 is represented as an action option $P_{n,l,1}$.

In the present embodiment, an incentive i is provided when a store is combined with a transit system n and a time slot l and also a coupon having a monetary value is issued to the store. Even if no store is combined with a transit system n and a time slot l, an incentive i may be provided if a fare discount is available to the transit system n.

Further, in the present embodiment, no incentive i is provided when a store is combined with a transit system n and a time slot l, but a coupon having a monetary value is not issued to the store. Also, no incentive i is provided when no store is combined with a transit system n and a time slot l.

Next, an operation of the congestion management apparatus 200A according to the present embodiment will be described. An operation of the congestion management processing unit 270A according to the present embodiment is the same as the operation illustrated in FIG. 11, and a description thereof will be omitted.

Figure 25:
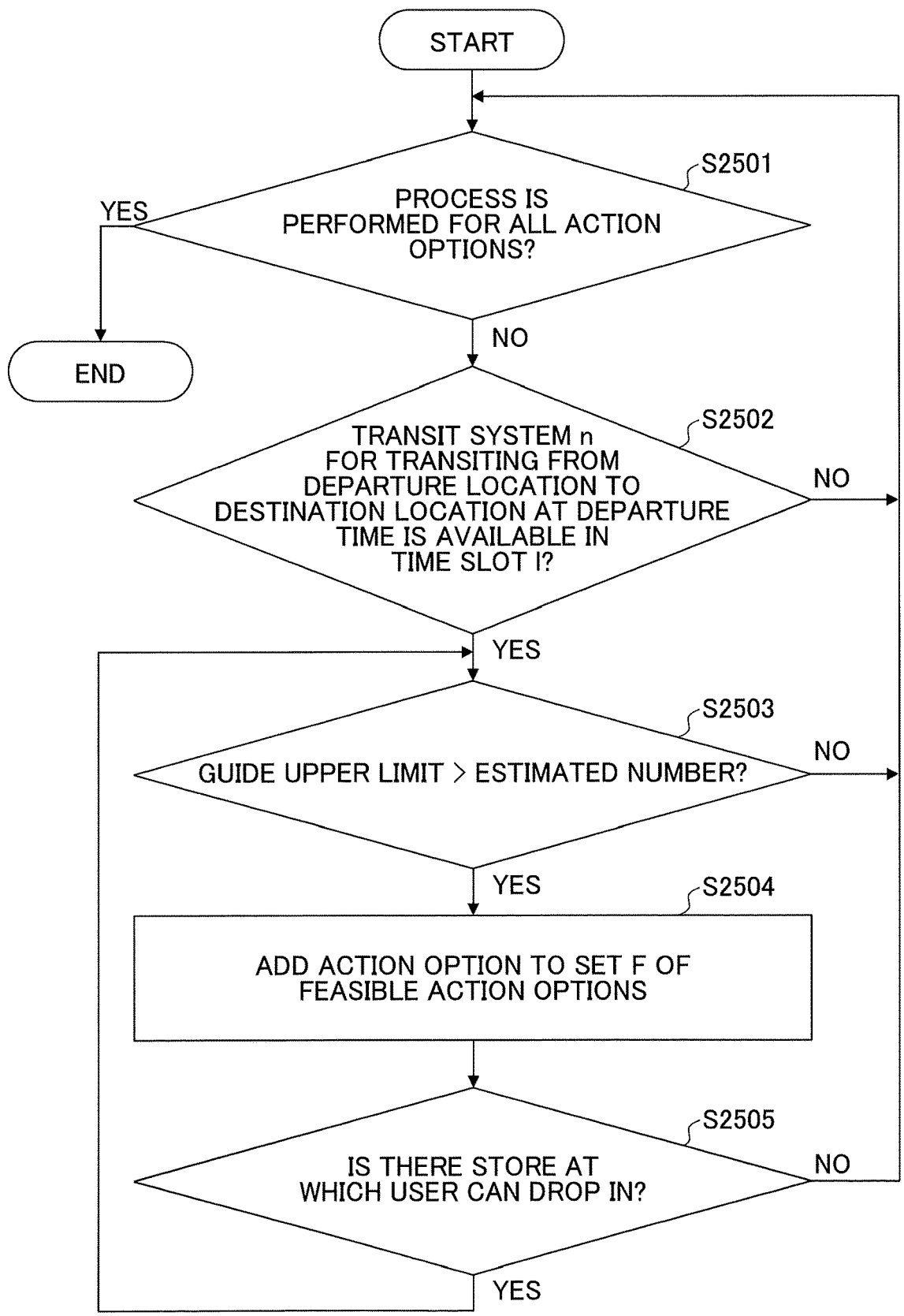
FIG. 25 is a flowchart illustrating a process performed by an option generating unit according to the second embodiment.

Referring to FIG. 25, a process performed by the option generating unit 273A according to the present embodiment will be described below.

Steps from S2501 through S2504 in FIG. 25 are the same as steps from S1201 through S1204, and a description thereof will be omitted.

Following step S2504, the option generating unit 273A determines whether there is a store at which the user can drop in within a time slot l (step S2505).

To be more specific, the option generating unit 273A receives position information of the terminal device 300 along with a request for presenting action options from the terminal device 300. Then, the option generating unit 273A determines whether the coupon information database 280 stores store information located within a predetermined range from a position indicated by the position information. When the coupon information database 280 stores a store located within the predetermined range, the option generating unit 273A determines that there is a store at which the user can drop in When the coupon information database 280 does not store any store located within the predetermined range, the option generating unit 273A determines that there is not a store at which the user can drop in.

In step S2505, when the coupon information database 280 does not store any store located within the predetermined range, the option generating unit 273A causes the process to return to step S2501.

In step S2505, when the coupon information database 280 stores a store located within the predetermined range, the option generating unit 273A causes the process to return to step S2503.

Next, a process performed by the congestion management processing unit 270A to determine a set (a combination) A* of action options based on choice probabilities will be described.

In the present embodiment, a decision variable $x_{n,l,i}$ is employed to determine whether to present an action option $P_{n,l,i}$ to the user. To be more specific, in the present embodiment, when the decision variable $x_{n,l,i}$ is 1, the action option $P_{n,l,i}$ is presented to the user. When the decision variable is 0, the action option $P_{n,l,i}$ is not presented to the user.

Herein, the option determining unit 277A according to the present embodiment determines, as a set A* of action options to be presented to the user, a set A of action options having the highest sales contribution level calculated by the sales contribution level calculating unit 274A. This is formulated as an optimization problem as indicated by the following formula (8).

Formula (8)

$$\max_X \sum_{n \in N} \sum_{l \in L} \sum_{i \in \{0,1\}} R_{n,l,i} \text{Prob}_{n,l,i}(X) \quad \text{Formula (8)}$$

$$\text{s.t. } x_{n,l,i} = 0 \ \forall \ p_{n,l,i} \notin F$$

In the above formula (8), $\text{Prob}_{n,l,i}(X)$ denotes a choice probability of an action option $P_{n,l,i}$ included in a set A of action options. This choice probability is calculated by the choice probability calculating unit 276A.

Also, in the above formula (8), $R_{n,l,1}$ denotes a sales contribution level obtained when the action option $P_{n,l,i}$ is selected among the action options included in the set A indicated by a matrix X. The sales contribution level is calculated by the sales contribution level calculating unit 274A by using the following formula (9), for example.

$$R_{n,l,i} = l(1 + \alpha i) \quad \text{Formula (9)}$$

In the formula (9), a denotes a predetermined constant. As is seen from the formula, a sales contribution level $R_{n,l,i}$ increases as a waiting time before transit becomes longer. When a coupon is provided, the sales contribution level further increases. Also, the sales contribution level $R_{n,l,i}$ may be calculated by a formula different from the above formula.

The option determining unit 277A according to the present embodiment calculates a product by multiplying a choice probability $\text{Prob}_{n,l,i}(X)$ by a sales contribution level $R_{n,l,i}$ for each action option $p_{n,l,i}$ included in a set A of action options indicated by a matrix X. The product obtained by multiplying the choice probability $\text{Prob}_{n,l,i}(X)$ by the congestion-reducing contribution level $R_{n,l,i}$ is an expected value of a congestion-reducing contribution level for each of the action options $p_{n,l,i}$.

The option determining unit 277A calculates an expected value of a sales contribution level for each action option $p_{n,l,i}$ included in a set A indicated by a matrix X. The option determining unit 277A obtains the sum of the calculated expected values as an expected value of a congestion-reducing contribution level of the set A. The option determining unit 277A determines a set A having the highest expected value of the sales contribution level as a set A*. Accordingly, action options included in the set A* are presented to the user.

Next, a calculation of a choice probability $\text{Prob}_{n,l,i}(X)$ by the choice probability calculating unit 276A will be described.

In the present embodiment, when a set A indicated by a matrix X is presented to the user, a probability (choice probability) $\text{Prob}_{n,l,i}(X)$ of an action option $p_{n,l,i}$ being selected by the user is calculated in the same way as the formula (6) except that utility $v_{n,l}$ is replaced with $v_{n,l,i}$.

Utility $v_{n,l,i}$ can be calculated by the following formula (10). In a case where a store is included in feasible action options $p_{n,l,i}$ generated by the option generating unit 273A, the choice probability calculating unit 276A according to the calculating unit 276A refers to the coupon information database 280. Further, when the coupon availability for this store is "available," the choice probability calculating unit 276A sets an incentive to i=1. When the coupon availability for this store is "unavailable," the choice probability calculating unit 276A sets an incentive to i=0.

$$V_{n,l,i} = ASC_n + \beta_{fare} \times \text{fare} + \beta_{TT} \times TT + \beta_{DT} \times DT + \beta_{CG} \times CG + \beta_i \times i \quad \text{Formula (10)}$$

$\beta_i$: parameter for each variable

To be more specific, the choice probability calculating unit 276A refers to the user database 210A and obtains user information corresponding to a user ID obtained from the terminal device 300. Then, the choice probability calculating unit 276A substitutes each value included in the user information into the formula (10).

Figure 26:
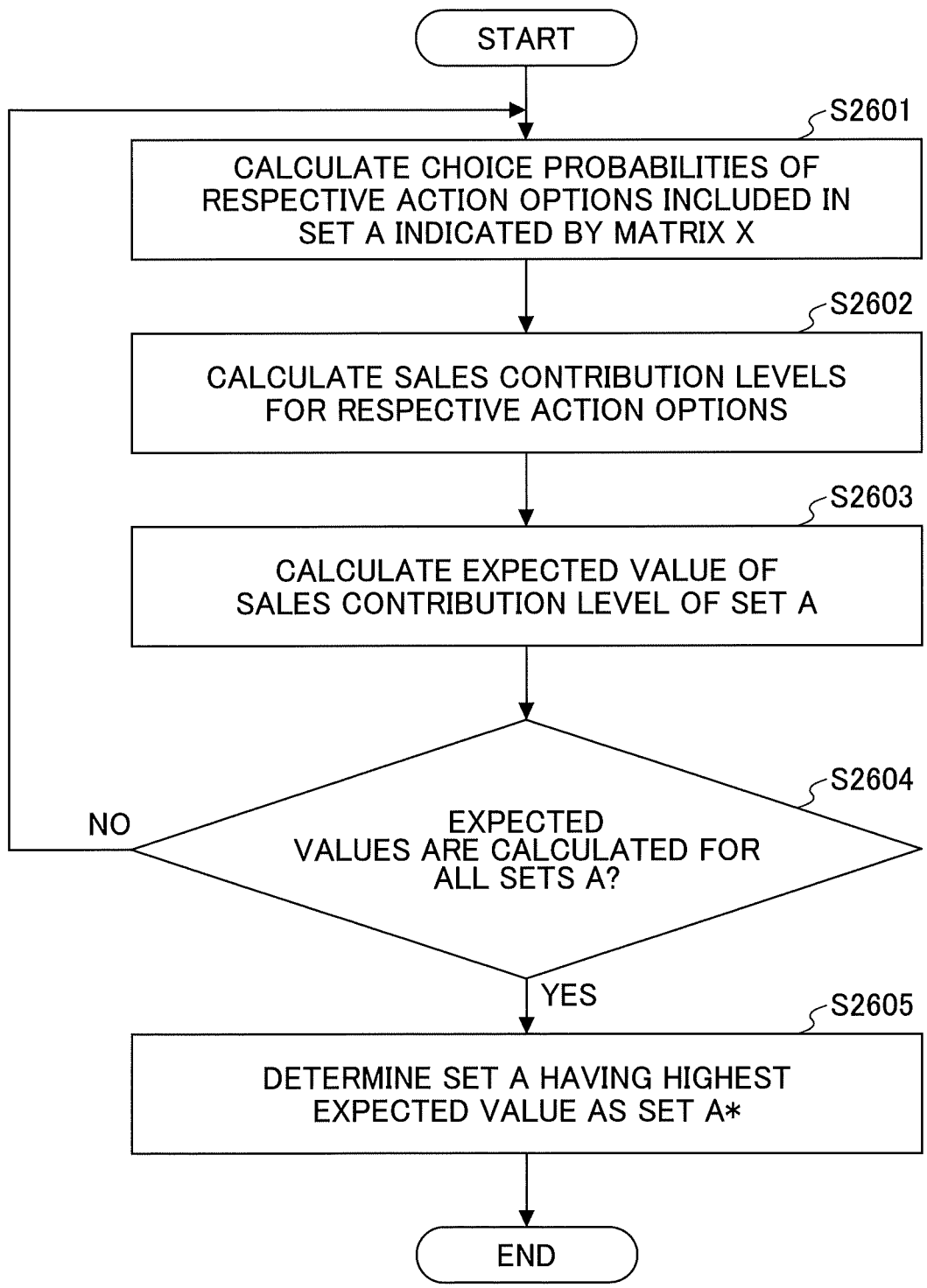
FIG. 26 is a drawing illustrating a process for determining a set of action options based on choice probabilities according to the second embodiment.

Next, referring to FIG. 26, determination of a set (a combination) A* of action options based on choice probabilities will be described in detail. FIG. 26 is a drawing illustrating a process for determining a set of action options based on choice probabilities.

Upon feasible action options $P_{n,l,i}$ being generated by the option generating unit 273A, the choice probability calculating unit 276A calculates a choice probability of each action option included in a set A indicated by a matrix X (step S2601).

To be more specific, the choice probability calculating unit 276A refers to the user database 210A and obtains user information associated with a user ID. Also, the choice probability calculating unit 276A refers to the congestion level database 230A and obtains congestion levels of transit systems n in time slots indicated by the action options $P_{n,l,i}$. Then, the choice probability calculating unit 276A calculates utility $V_{n,l,i}$ by the formula (10).

Next, the choice probability calculating unit 276A calculates choice probabilities $\text{Prob}_{n,l,i}(X)$.

Next, the sales contribution level calculating unit 274A calculates sales contribution levels $R_{n,l,i}$ of the respective action options included in the set A (step S2602).

Next, based on the choice probabilities $\text{Prob}_{n,l,i}(X)$ and the sales contribution levels $R_{n,l,i}$ of the respective action options $p_{n,l,i}$, the option determining unit 277A calculates an expected value of a sales contribution level of the set A (step S2603).

To be more specific, the option determining unit 277A calculates an expected value of the sales contribution level by multiplying the choice probability $\text{Prob}_{n,l,i}(X)$ by the sales contribution level $R_{n,l,i}$ for each of the action options $p_{n,l,i}$ by using the formula (8). Then, the option determining unit 277A obtains the sum of the calculated expected values of the action options $p_{n,l,i}$ as an expected value of a sales contribution level of the set A.

Next, the option determining unit 277A determines whether expected values of all sets A, namely all patterns that can be obtained from the set F of the feasible action options $p_{n,l,i}$, are calculated (step S2604). In step S2604, when the expected values of all the sets A are not calculated, the option determining unit 277A causes the process to return to S2601.

In step S2604, when the expected values of all the sets A are calculated, the option determining unit 277A determines, as a set A* of action options $p_{n,l,i}$ to be presented to the terminal device 300, a set A having the highest expected value of the sales contribution level (step S2605). The process ends.

Figure 27:
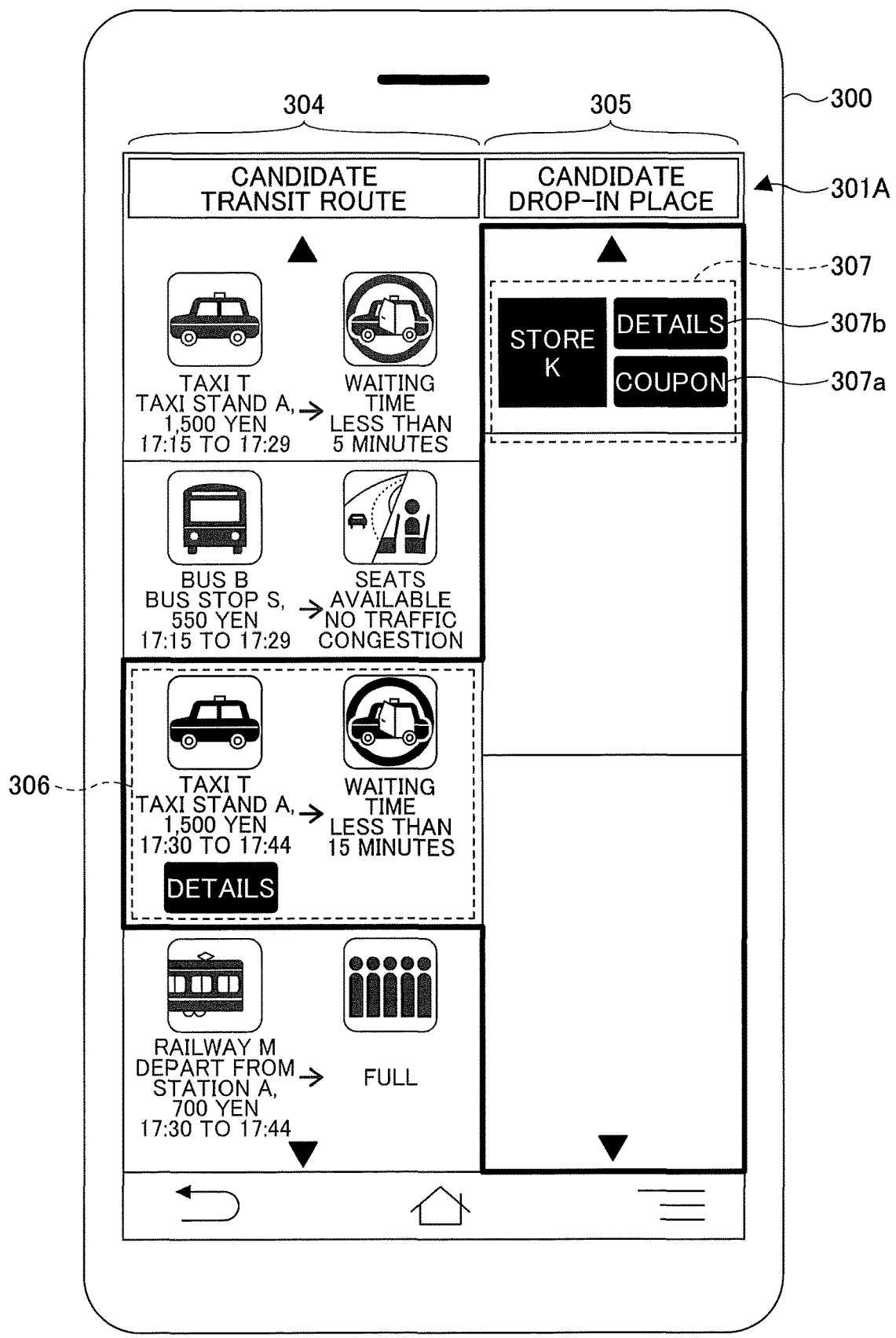
FIG. 27 is a drawing illustrating an example of action options displayed on a terminal device according to the second embodiment.

Referring to FIG. 27, an example in which action options $P_{n,l,i}$ are displayed on the terminal device 300 will be described below. FIG. 27 is a drawing illustrating an example of action options displayed on the terminal device according to the second embodiment.

A screen 301A illustrated in FIG. 27 includes a display field 304 and a display field 305. The screen 301A displays, as an action option, each combination of a transit system and store(s) in a corresponding time slot.

In the display field 304 of the screen 301A, combinations of transit systems n and time slots 1 are displayed. In the display field 305 of the screen 301A, store information associated with each of the combinations of the transit systems n and the time slots 1 is displayed.

The example of FIG. 27 illustrates a case in which a combination of "transiting by taxi T from a taxi stand A between 17:30 to 17:44" is selected by a user in the display field 304. In this case, the display field 305 displays store information 307 of a store associated with this combination.

When "coupon availability" for a corresponding store is "available" in the coupon information database 280, the store information 307 may include a URL (Uniform Resource Locator) of a web page on which a coupon is displayed. Further, the store information 307 may include a URL of a home page of the corresponding store.

In the example of FIG. 27, when a coupon button 307a of the store information 307 is operated, a coupon may be displayed on the screen 301A. Further, in the example of FIG. 27, when a details button 307b of the store information 307 is operated, a home page of store K may be displayed on the screen 301A.

In the example of FIG. 27, congestion status of each of the transit systems is displayed, and congestion status of the store is not displayed; however, the present embodiment is not limited thereto. For example, when a drop-in place is a facility such as a theater or a restaurant whose seating capacity is limited, congestion status indicating a congestion level of a corresponding facility stored in the congestion level database 230A may be displayed.

As described, in the present embodiment, expected values of sale contribution levels are calculated based on choice probabilities by taking into account incentives, which are each provided by selecting a corresponding action option, and an action option having the greatest expected value is displayed on the terminal device 300.

According to the present embodiment, for a user having a high satisfaction level with respect to an incentive, an action option to which an incentive is available can be presented, allowing the presented action option to be selected by the user with high probability.

Accordingly, it is possible for an action that contributes to reducing congestion to be selected even when, for example, transportation is congested.

Third Embodiment

In the following, a third embodiment will be described with reference to the drawings. The third embodiment differs from the first and second embodiments in that both a congestion-reducing contribution level and a sales contribution level are used. In the following third embodiment, only differences from the first and second embodiments will be described. Elements having the same functions or configurations as those in the first and second embodiments are referred to by the same numerals used in the first and second embodiments, and a description thereof will be omitted.

Figure 28:
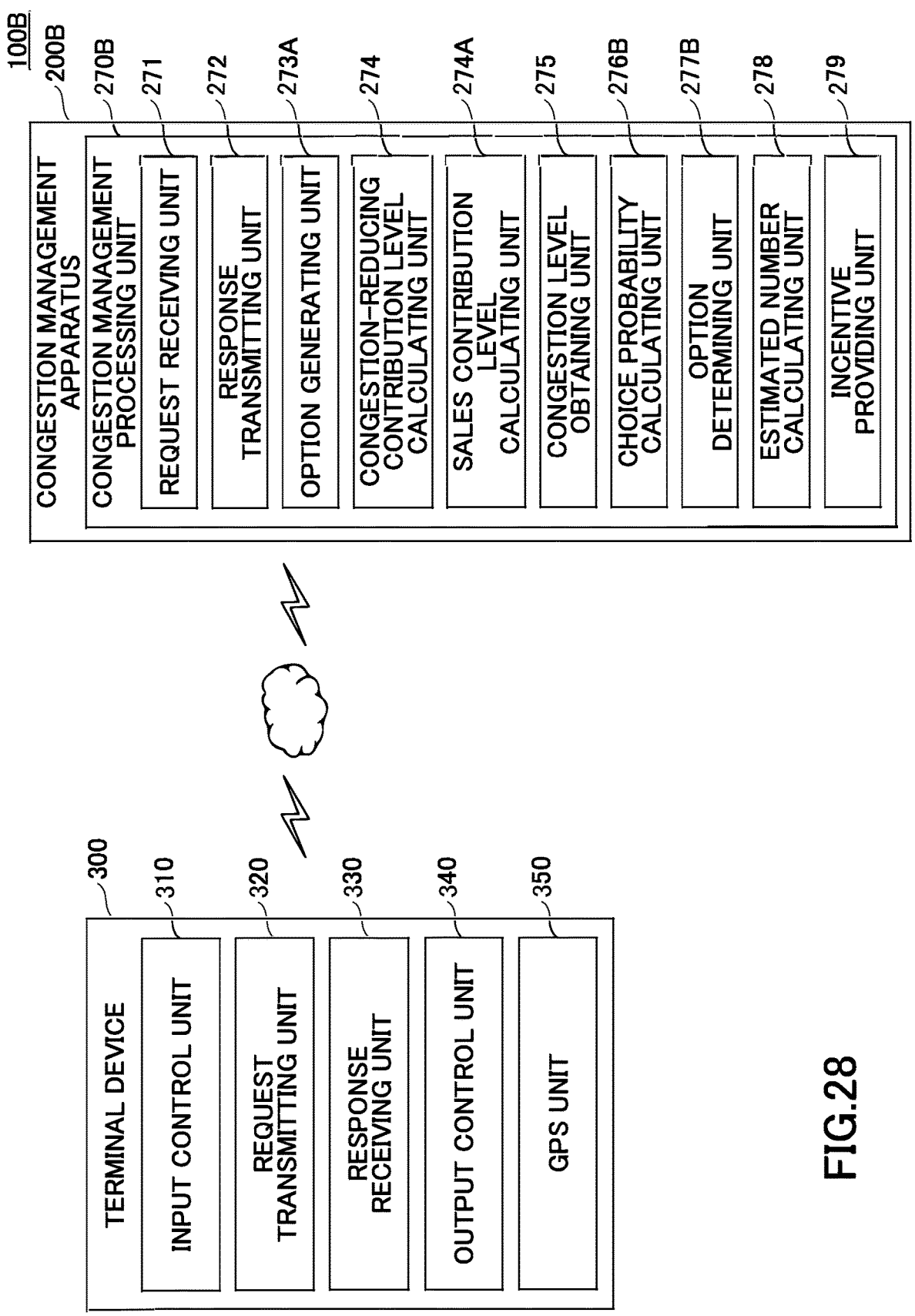
FIG. 28 is a drawing illustrating functions of a congestion management apparatus included in a congestion management system according to a third embodiment.

FIG. 28 is a drawing illustrating functions of a congestion management apparatus included in a congestion management system according to the third embodiment.

A congestion management system 100B according to the present embodiment includes the terminal device 300 and a congestion management apparatus 200B. The congestion management apparatus 200B according to the present embodiment includes the databases included in the congestion management apparatus 200A according to the second embodiment, and also includes a congestion management processing unit 270B.

The congestion management processing unit 270B according to the present embodiment includes the request receiving unit 271, the response transmitting unit 272, the option generating unit 273A, the contribution level calculating unit 274, and the sales contribution level calculating unit 274A.

Also, the congestion management processing unit 270B according to the present embodiment includes the congestion level obtaining unit 275, the choice probability calculating unit 276A, an option determining unit 277B, and the estimated number calculating unit 278.

In order to determine a set A* of action options to be output to the terminal device 300, the option determining unit 277B according to the present embodiment calculates congestion reduction and sales contribution levels of the respective action options. Then, the option determining unit 277B calculates the sum of the products of the congestion reduction and sales contribution levels and choice probabilities. Further, the option determining unit 277B calculates an expected value of a congestion reduction and sales contribution level for each set A. The option determining unit 277B determines a set A having the highest expected value as a set A*.

A congestion reduction and sales contribution level can be expressed by the following formula (11) by using a congestion-reducing contribution level and a sales contribution level.

$$R_{n,l,i} = \alpha_1 R_{n,l,i}^{cong} \alpha_2 R_{n,l,i}^{sale} \qquad \text{Formula (11)}$$

In the formula (11), $R^{cong}_{n,l,I}$ denotes a congestion-reducing contribution level, $R^{sale}_{n,l,i}$ denotes a sales contribution level. Also, in the formula (11), α1 and α2 are predetermined constants.

The constants α1 and α2 represent weight given to the congestion-reducing contribution level and the sales contribution level, respectively. Thus, by setting constants α1 and α2 as desired, the congestion-reducing contribution level and the sales contribution level can be weighted separately.

As described, according to the present embodiment, action options having a high probability of being selected and taking into account both a congestion-reducing contribution level and a sales contribution level can be presented to a user. Thus, according to the present embodiment, it is possible for an action contributing to relieving congestion to be selected.

In the above description, the formula (11) is used in the third embodiment; however, the formula (11) may also be used in the first embodiment and the second embodiment.

When the formula (11) is used in the first embodiment, the constant α1 may be set to 1 and the constant α2 may be set to 0. When the formula (11) is used in the second embodiment, the constant α1 may be set to 0 and the constant α2 may be set to 1.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention have been described in detail, it should be understood that the various changes, substitutions, and alterations could be made hereto without departing from the spirit and scope of the invention.

What is claimed is:

1. A congestion management apparatus comprising:
   a memory configured to store, on a per-action-option basis, upper limits on numbers of users allowed to be guided to actions indicated by action options; and
   a processor coupled to the memory and configured to
   generate time-slot-based action options for a user of a terminal device in response to receiving a presentation request from the terminal device, based on a current time obtained from the terminal device and GPS position information obtained from the terminal device,
   calculate, for each of the generated action options, choice probabilities of the action options with respect to the user, based on congestion levels, wherein the congestion levels are set based on road traffic information obtained in real time, and
   calculate, for each of the action options, estimated numbers of previous users assumed to have selected the action options, based on choice probabilities of each of the action options with respect to the previous users,
   wherein the processor is configured to extract from the memory, based on the upper limits and the estimated numbers for the action options, feasible action options specific to the user,
   wherein the processor is further configured to
   determine, from the extracted feasible action options, action options to be presented to the user based on congestion-reducing contribution levels obtained from the extracted feasible action options,
   generate, from the extracted feasible action options, all patterns of action options to be possibly presented to the user,
   calculate, for each of the patterns, products of the choice probabilities and the congestion-reducing contribution levels of action options to obtain a sum of the products,
   determine action options included in a pattern having the largest sum of the products as the action options to be presented to the user, and
   cause the terminal device to display the action options included in the pattern having the largest sum of the products in descending order of the choice probabilities of the action options.

2. The congestion management apparatus according to claim 1, wherein the feasible action options extracted by the processor to be presented to the user are action options whose estimated numbers are less than the upper limits.

3. The congestion management apparatus according to claim 1, wherein the processor is configured to calculate the choice probabilities of the action options, based on values indicating user satisfaction levels upon selecting the action options.

4. The congestion management apparatus according to claim 3, wherein the memory is configured to store, on a per-user basis, user information used to calculate the values indicating the satisfaction levels.

5. The congestion management apparatus according to claim 1, wherein the processor is further configured to calculate the congestion-reducing contribution levels based on the upper limits and the estimated numbers for the action options.

6. The congestion management apparatus according to claim 1, wherein the processor is further configured to determine the action options to be presented to the user from the extracted feasible action options based on sales contribution levels obtained from the extracted feasible action options.

7. The congestion management apparatus according to claim 6, wherein the sales contribution levels are calculated based on the time slot and presence or absence of monetary values, the monetary values being obtained from the extracted feasible action options.

8. The congestion management apparatus according to claim 6, wherein the processor is further configured to
   calculate, for each of the patterns, products of the choice probabilities and the sales contribution levels of action options to obtain a sum of the products.

9. The congestion management apparatus according to claim 1, wherein the processor is further configured to determine the action options to be presented to the user from the extracted feasible action options based on the congestion-reducing contribution levels and sales contribution levels both obtained from the extracted feasible action options.

10. A non-transitory recording medium having stored therein a program for causing a computer to execute a congestion management process comprising:
    generating time-slot-based action options for a user of a terminal device in response to receiving a presentation request from the terminal device, based on a current time obtained from the terminal device and GPS position information obtained from the terminal device;
    calculating, for each of the generated action options, choice probabilities of the action options with respect to the user, based on congestion levels, wherein the congestion levels are set based on road traffic information obtained in real time; and
    calculating, for each of the action options, estimated numbers of previous users assumed to have selected the action options, based on choice probabilities of each of the action options with respect to the previous users,
    wherein the generating includes, by referring to a memory in which upper limits on numbers of users allowed to be guided to actions indicated by the action options are stored on a per-action-option basis, extracting from the memory feasible action options specific to the user based on the upper limits and the estimated numbers for the action options,
    wherein the congestion management process further comprises:
    determining, from the extracted feasible action options, action options to be presented to the user based on congestion-reducing contribution levels obtained from the extracted feasible action options;
    generating, from the extracted feasible action options, all patterns of action options to be possibly presented to the user;
    calculating, for each of the patterns, products of the choice probabilities and the congestion-reducing contribution levels of action options to obtain a sum of the products;
    determining action options included in a pattern having the largest sum of the products as the action options to be presented to the user; and
    causing the terminal device to display the action options included in the pattern having the largest sum of the products in descending order of the choice probabilities of the action options.

11. A congestion management method performed by a computer, the method comprising:
    generating time-slot-based action options for a user of a terminal device in response to receiving a presentation request from the terminal device, based on a current time obtained from the terminal device and GPS position information obtained from the terminal device;

calculating, for each of the generated action options, choice probabilities of the action options with respect to the user, based on congestion levels, wherein the congestion levels are set based on road traffic information obtained in real time; and calculating, for each of the action options, estimated numbers of previous users assumed to have selected the action options, based on choice probabilities of each of the action options with respect to the previous users, wherein the generating includes, by referring to a memory in which upper limits on numbers of users allowed to be guided to actions indicated by the action options are stored on a per-action-option basis, extracting from the memory feasible action options specific to the user based on the upper limits and the estimated numbers for the action options, wherein the method further comprises:

determining, from the extracted feasible action options, action options to be presented to the user based on congestion-reducing contribution levels obtained from the extracted feasible action options;

generating, from the extracted feasible action options, all patterns of action options to be possibly presented to the user;

calculating, for each of the patterns, products of the choice probabilities and the congestion-reducing contribution levels of action options to obtain a sum of the products;

determining action options included in a pattern having the largest sum of the products as the action options to be presented to the user; and causing the terminal device to display the action options included in the pattern having the largest sum of the products in descending order of the choice probabilities of the action options.

* * * * *